(12) United States Patent
Chen et al.

(10) Patent No.: US 12,552,487 B2
(45) Date of Patent: Feb. 17, 2026

(54) ELECTRIC BALANCE VEHICLES

(71) Applicant: RAZOR USA LLC, Cerritos, CA (US)

(72) Inventors: Weibin Chen, Cerritos, CA (US);
Zhiwei Huang, Cerritos, CA (US);
Yufeng Wang, Cerritos, CA (US);
Hnolai Guo, Cerritos, CA (US);
Xiaoting Xia, Cerritos, CA (US)

(73) Assignee: Razor USA LLC, Cerritos, CA (US)

( * ) Notice: Subject to any disclaimer, the term of this patent is extended or adjusted under 35 U.S.C. 154(b) by 0 days.

(21) Appl. No.: 18/583,736

(22) Filed: Feb. 21, 2024

(65) Prior Publication Data

US 2024/0343335 A1    Oct. 17, 2024

Related U.S. Application Data

(63) Continuation of application No. 15/941,505, filed on Mar. 30, 2018, now Pat. No. 12,227,257.
(Continued)

(30) Foreign Application Priority Data

Apr. 1, 2017    (CN) .......................... 201720344437.6
Apr. 1, 2017    (CN) .......................... 201720344816.5
(Continued)

(51) Int. Cl.
*B62K 11/00* (2006.01)
*B62J 43/10* (2020.01)
*B62J 43/20* (2020.01)

(52) U.S. Cl.
CPC ........ *B62K 11/007* (2016.11); *B62K 2204/00* (2013.01)

(58) Field of Classification Search
CPC .. B62K 11/007; B62K 2204/00; B62K 3/002; A63C 17/12; B62M 6/90; B62J 43/00; B62J 43/10; B62J 43/13; B62J 43/20
(Continued)

(56) References Cited

U.S. PATENT DOCUMENTS 3,860,264 A    1/1975    Douglas et al.
4,065,146 A    12/1977    Denzer
(Continued)

FOREIGN PATENT DOCUMENTS

CA    2903571 A1    12/2015
CN    2486450 Y    4/2002
(Continued)

OTHER PUBLICATIONS

CN206437133, English Translation (Year: 2017).*
(Continued)

*Primary Examiner* — Anne Marie M Boehler
(74) *Attorney, Agent, or Firm* — Knobbe, Martens, Olson & Bear, LLP

(57) ABSTRACT

Various electric balance vehicles are described. In some embodiments, the vehicle has first and second pedal housings to support a respective foot of a user. The first and second pedal housings can be rotatable relative to each other. The vehicle can have first and second wheel assemblies. An axle can extend substantially between the wheel assemblies. In some embodiments, one pedal housing rotates relative to the axle and one housing is rotationally fixed relative to the housing. The vehicle can balance and provide locomotion to the user.

23 Claims, 9 Drawing Sheets

Related U.S. Application Data

(60) Provisional application No. 62/552,963, filed on Aug. 31, 2017.

(30) Foreign Application Priority Data

Apr. 1, 2017 (CN) .................. 201720344852.1
Apr. 1, 2017 (CN) .................. 201730105822.0

(58) Field of Classification Search
USPC ...................................................... 180/218
See application file for complete search history.

(56) References Cited

U.S. PATENT DOCUMENTS

| | | |
|---|---|---|
| 4,076,270 A | 2/1978 | Winchell |
| 4,151,892 A | 5/1979 | Francken |
| 4,281,734 A | 8/1981 | Johnston |
| 4,325,565 A | 4/1982 | Winchell |
| 4,354,569 A | 10/1982 | Eichholz |
| 4,484,648 A | 11/1984 | Jephcott |
| 4,556,997 A | 12/1985 | Takamiya et al. |
| 4,624,469 A | 11/1986 | Bourne, Jr. |
| 4,712,806 A | 12/1987 | Patrin |
| 4,874,055 A | 10/1989 | Beer |
| 4,991,861 A | 2/1991 | Carn et al. |
| 5,011,171 A | 4/1991 | Cook |
| 5,165,711 A | 11/1992 | Tsai |
| D355,148 S | 2/1995 | Orsolini |
| 5,522,568 A | 6/1996 | Kamen et al. |
| 5,571,892 A | 11/1996 | Fuji et al. |
| 5,695,021 A | 12/1997 | Schaffner et al. |
| 5,701,965 A | 12/1997 | Kamen et al. |
| 5,701,968 A | 12/1997 | Wright-Ott et al. |
| 5,775,452 A | 7/1998 | Patmont |
| 5,791,425 A | 8/1998 | Kamen et al. |
| 5,794,730 A | 8/1998 | Kamen |
| 5,848,660 A | 12/1998 | McGreen |
| 5,954,349 A | 9/1999 | Rutzel |
| 5,971,091 A | 10/1999 | Kamen et al. |
| 5,975,225 A | 11/1999 | Kamen et al. |
| 6,050,357 A | 4/2000 | Staelin et al. |
| 6,052,647 A | 4/2000 | Parkinson et al. |
| 6,062,600 A | 5/2000 | Kamen et al. |
| 6,070,494 A | 6/2000 | Horng |
| 6,148,944 A * | 11/2000 | Adomi .................. B62M 6/90 180/68.5 |
| 6,223,104 B1 | 4/2001 | Kamen et al. |
| D444,184 S | 6/2001 | Kettler |
| 6,273,212 B1 | 8/2001 | Husted et al. |
| 6,288,505 B1 | 9/2001 | Heinzmann et al. |
| 6,302,230 B1 | 10/2001 | Kamen et al. |
| 6,332,103 B1 | 12/2001 | Steenson et al. |
| 6,357,544 B1 | 3/2002 | Kamen et al. |
| 6,367,817 B1 | 4/2002 | Kamen et al. |
| 6,386,576 B1 | 5/2002 | Kamen et al. |
| 6,405,816 B1 | 6/2002 | Kamen et al. |
| 6,408,240 B1 | 6/2002 | Morrell et al. |
| 6,415,879 B2 | 7/2002 | Kamen et al. |
| 6,435,535 B1 | 8/2002 | Field et al. |
| 6,443,250 B1 | 9/2002 | Kamen et al. |
| 6,538,411 B1 | 3/2003 | Field et al. |
| 6,543,564 B1 | 4/2003 | Kamen et al. |
| 6,547,026 B2 | 4/2003 | Kamen et al. |
| 6,553,271 B1 | 4/2003 | Morrell |
| 6,561,294 B1 | 5/2003 | Kamen et al. |
| 6,575,539 B2 | 6/2003 | Reich |
| 6,581,714 B1 | 6/2003 | Kamen et al. |
| 6,598,941 B2 | 7/2003 | Field et al. |
| 6,651,763 B1 | 11/2003 | Kamen et al. |
| 6,651,766 B2 | 11/2003 | Kamen et al. |
| D489,027 S | 4/2004 | Waters |
| D489,029 S | 4/2004 | Waters |
| 6,715,845 B2 | 4/2004 | Kamen et al. |
| D489,300 S | 5/2004 | Chang et al. |
| D493,127 S | 7/2004 | Waters et al. |
| D493,128 S | 7/2004 | Waters et al. |
| D493,129 S | 7/2004 | Waters et al. |
| D493,392 S | 7/2004 | Waters et al. |
| D494,099 S | 8/2004 | Maurer et al. |
| 6,779,621 B2 | 8/2004 | Kamen et al. |
| 6,789,640 B1 | 9/2004 | Arling et al. |
| 6,796,396 B2 | 9/2004 | Kamen et al. |
| 6,799,649 B2 | 10/2004 | Kamen et al. |
| 6,815,919 B2 | 11/2004 | Field et al. |
| 6,827,163 B2 | 12/2004 | Amsbury et al. |
| 6,837,327 B2 | 1/2005 | Heinzmann |
| 6,866,107 B2 | 3/2005 | Heinzmann et al. |
| 6,868,931 B2 | 3/2005 | Morrell et al. |
| 6,874,591 B2 | 4/2005 | Morrell et al. |
| 6,889,784 B2 | 5/2005 | Troll |
| 6,907,949 B1 | 6/2005 | Wang |
| D507,206 S | 7/2005 | Wang |
| 6,920,947 B2 | 7/2005 | Kamen et al. |
| 6,926,294 B2 | 8/2005 | Lewis |
| 6,929,080 B2 | 8/2005 | Kamen et al. |
| 6,965,206 B2 | 11/2005 | Kamen et al. |
| 6,969,079 B2 | 11/2005 | Kamen et al. |
| 6,979,003 B2 | 12/2005 | Adams |
| 6,992,452 B1 | 1/2006 | Sachs et al. |
| 7,000,933 B2 | 2/2006 | Arling et al. |
| 7,004,271 B1 | 2/2006 | Kamen et al. |
| 7,006,901 B2 | 2/2006 | Wang |
| 7,017,686 B2 | 3/2006 | Kamen et al. |
| 7,023,330 B2 | 4/2006 | Kamen et al. |
| 7,083,178 B2 | 8/2006 | Potter |
| 7,090,040 B2 | 8/2006 | Kamen et al. |
| 7,091,724 B2 | 8/2006 | Heinzmann et al. |
| D528,468 S | 9/2006 | Arling et al. |
| 7,130,702 B2 | 10/2006 | Morrell |
| 7,131,706 B2 | 11/2006 | Kamen et al. |
| 7,157,875 B2 | 1/2007 | Kamen et al. |
| 7,174,976 B2 | 2/2007 | Kamen et al. |
| 7,178,614 B2 | 2/2007 | Ishii |
| 7,182,166 B2 | 2/2007 | Gray et al. |
| 7,195,259 B2 | 3/2007 | Gang |
| 7,210,544 B2 | 5/2007 | Kamen et al. |
| 7,243,572 B1 | 7/2007 | Arling et al. |
| 7,263,453 B1 | 8/2007 | Gansler et al. |
| D551,592 S | 9/2007 | Chang et al. |
| D551,722 S | 9/2007 | Chang et al. |
| 7,273,116 B2 | 9/2007 | Kamen et al. |
| 7,275,607 B2 | 10/2007 | Kamen et al. |
| 7,303,032 B2 | 12/2007 | Kahlert et al. |
| 7,338,056 B2 | 3/2008 | Chen et al. |
| 7,357,202 B2 | 4/2008 | Kamen et al. |
| 7,363,993 B2 | 4/2008 | Ishii |
| 7,367,572 B2 | 5/2008 | Jiang |
| 7,370,713 B1 | 5/2008 | Kamen |
| 7,407,175 B2 | 8/2008 | Kamen et al. |
| 7,424,927 B2 | 9/2008 | Hiramatsu |
| 7,437,202 B2 | 10/2008 | Morrell |
| 7,467,681 B2 | 12/2008 | Hiramatsu |
| 7,469,760 B2 | 12/2008 | Kamen et al. |
| 7,479,872 B2 | 1/2009 | Kamen et al. |
| 7,481,291 B2 | 1/2009 | Nishikawa |
| 7,546,889 B2 | 6/2009 | Kamen et al. |
| 7,587,334 B2 | 9/2009 | Walker et al. |
| 7,592,900 B2 | 9/2009 | Kamen et al. |
| D601,922 S | 10/2009 | Imai et al. |
| 7,597,334 B2 | 10/2009 | Chen |
| 7,643,834 B2 | 1/2010 | Ioppe et al. |
| 7,681,895 B2 | 3/2010 | Chen |
| 7,690,447 B2 | 4/2010 | Kamen et al. |
| 7,690,452 B2 | 4/2010 | Kamen et al. |
| 7,703,568 B2 | 4/2010 | Ishii |
| 7,708,094 B2 | 5/2010 | Kamen et al. |
| 7,717,439 B2 | 5/2010 | Chen |
| 7,740,099 B2 | 6/2010 | Field et al. |
| 7,757,794 B2 | 7/2010 | Heinzmann |
| 7,766,351 B2 | 8/2010 | Chen et al. |
| 7,775,534 B2 | 8/2010 | Chen et al. |
| 7,779,939 B2 | 8/2010 | Kamen et al. |
| 7,783,392 B2 | 8/2010 | Oikawa |

(56) References Cited

U.S. PATENT DOCUMENTS

| | | |
|---|---|---|
| 7,789,174 B2 | 9/2010 | Kamen et al. |
| 7,812,715 B2 | 10/2010 | Kamen et al. |
| 7,857,088 B2 | 12/2010 | Field et al. |
| 7,866,429 B2 | 1/2011 | Ishii et al. |
| 7,891,680 B2 | 2/2011 | Chen et al. |
| 7,900,725 B2 | 3/2011 | Heinzmann et al. |
| 7,938,207 B2 | 5/2011 | Kamen et al. |
| 7,950,123 B2 | 5/2011 | Arling et al. |
| 7,958,956 B2 | 6/2011 | Kakinuma et al. |
| 7,962,256 B2 | 6/2011 | Sterns et al. |
| 7,979,179 B2 | 7/2011 | Gansler |
| 7,980,568 B2 | 7/2011 | Chen |
| 8,014,923 B2 | 9/2011 | Ishii et al. |
| 8,016,060 B2 | 9/2011 | Miki et al. |
| 8,028,777 B2 | 10/2011 | Kakinuma et al. |
| 8,047,556 B2 | 11/2011 | Jang et al. |
| 8,073,575 B2 | 12/2011 | Tachibana et al. |
| 8,074,388 B2 | 12/2011 | Trainer |
| 8,091,672 B2 | 1/2012 | Gutsch et al. |
| 8,113,524 B2 | 2/2012 | Karpman |
| 8,146,696 B2 | 4/2012 | Kaufman |
| 8,157,274 B2 | 4/2012 | Chen |
| 8,162,089 B2 | 4/2012 | Shaw |
| 8,165,771 B2 | 4/2012 | Doi |
| 8,170,780 B2 | 5/2012 | Field et al. |
| 8,186,462 B2 | 5/2012 | Kamen et al. |
| 8,225,891 B2 | 7/2012 | Takenaka et al. |
| 8,248,222 B2 | 8/2012 | Kamen et al. |
| 8,271,185 B2 | 9/2012 | Doi |
| 8,285,474 B2 | 10/2012 | Doi |
| 8,301,354 B2 | 10/2012 | Doi |
| 8,322,477 B2 | 12/2012 | Kamen et al. |
| 8,381,847 B2 | 2/2013 | Polutnik |
| 8,408,565 B2 | 4/2013 | An |
| 8,417,404 B2 | 4/2013 | Yen et al. |
| 8,453,340 B2 | 6/2013 | Van der Merwe et al. |
| 8,453,768 B2 | 6/2013 | Kamen et al. |
| 8,459,667 B2 | 6/2013 | Ungar et al. |
| 8,459,668 B2 | 6/2013 | Yoon |
| 8,467,941 B2 | 6/2013 | Field et al. |
| 8,469,376 B2 | 6/2013 | Kristiansen |
| 8,490,723 B2 | 7/2013 | Heinzmann et al. |
| 8,532,877 B2 | 9/2013 | Oikawa |
| 8,579,769 B2 | 11/2013 | Sans |
| 8,584,782 B2 | 11/2013 | Chen |
| 8,606,468 B2 | 12/2013 | Kosaka |
| 8,616,313 B2 | 12/2013 | Simeray et al. |
| 8,684,123 B2 | 4/2014 | Chen |
| 8,688,303 B2 | 4/2014 | Stevens et al. |
| 8,738,278 B2 | 5/2014 | Chen |
| 8,763,733 B2 | 7/2014 | Hamaya et al. |
| 8,807,250 B2 | 8/2014 | Chen |
| 8,830,048 B2 | 9/2014 | Kamen et al. |
| 8,860,362 B2 | 10/2014 | Kamen et al. |
| 8,960,353 B2 | 2/2015 | Chen |
| 8,978,791 B2 | 3/2015 | Ha et al. |
| 9,045,190 B2 | 6/2015 | Chen |
| 9,101,817 B2 | 8/2015 | Doerksen |
| D737,723 S | 9/2015 | Ying et al. |
| D738,256 S | 9/2015 | Ying et al. |
| D739,906 S | 9/2015 | Chen |
| 9,239,158 B2 | 1/2016 | Rothschilld |
| 9,376,155 B2 | 6/2016 | Ying et al. |
| 9,403,573 B1 | 8/2016 | Mazzei |
| 9,434,438 B1 | 9/2016 | Kim et al. |
| 9,452,802 B2 | 9/2016 | Ying et al. |
| D778,782 S | 2/2017 | Chen et al. |
| D779,375 S | 2/2017 | Zeng |
| D780,626 S | 3/2017 | Li et al. |
| 9,604,692 B1 | 3/2017 | Kim |
| D783,452 S | 4/2017 | Ying |
| D783,751 S | 4/2017 | Yao |
| D784,195 S | 4/2017 | Ying |
| D784,196 S | 4/2017 | Ying |
| D784,197 S | 4/2017 | Ying |
| D784,198 S | 4/2017 | Zhu |
| D785,112 S | 4/2017 | Ying |
| D785,113 S | 4/2017 | Ying |
| D785,114 S | 4/2017 | Ying |
| D785,115 S | 4/2017 | Ying |
| D785,736 S | 5/2017 | Ying |
| D786,130 S | 5/2017 | Huang |
| D786,994 S | 5/2017 | Chen |
| 9,638,285 B2 | 5/2017 | Huang |
| 9,656,713 B1 | 5/2017 | Ryan et al. |
| 9,688,340 B1 | 6/2017 | Kroymann |
| 9,745,013 B2 | 8/2017 | Wood |
| D803,722 S | 11/2017 | Ying |
| D803,963 S | 11/2017 | Desberg |
| D805,429 S | 12/2017 | Cao |
| 9,840,302 B2 * | 12/2017 | Zeng .................. B60K 1/04 |
| D807,457 S | 1/2018 | Desberg |
| D808,300 S | 1/2018 | Cao |
| D808,855 S | 1/2018 | Zhang et al. |
| D808,856 S | 1/2018 | Zhang et al. |
| D808,857 S | 1/2018 | Zhang |
| D810,618 S | 2/2018 | Li |
| D812,521 S | 3/2018 | Yao |
| D817,811 S | 5/2018 | Wang et al. |
| RE46,964 E | 7/2018 | Chen |
| 10,059,397 B2 | 8/2018 | Ying et al. |
| 10,144,477 B2 | 12/2018 | Lankford et al. |
| D837,322 S | 1/2019 | Desberg |
| D837,323 S | 1/2019 | Desberg |
| D840,872 S | 2/2019 | Desberg |
| D850,326 S | 6/2019 | Zheng |
| D852,891 S | 7/2019 | Yao |
| D865,095 S | 10/2019 | Desberg |
| D865,890 S | 11/2019 | Desberg |
| 10,583,886 B2 * | 3/2020 | Li ..................... B62K 23/08 |
| D899,540 S | 10/2020 | Desberg |
| D899,541 S | 10/2020 | Desberg |
| 10,800,477 B2 * | 10/2020 | Shang .............. B62K 11/02 |
| D928,264 S | 8/2021 | Ke et al. |
| 11,130,543 B2 * | 9/2021 | Ying ................. B62D 51/02 |
| 11,141,647 B2 | 10/2021 | Li |
| D941,948 S | 1/2022 | Desberg |
| D944,349 S | 2/2022 | Zhao |
| D958,278 S | 7/2022 | Desberg |
| D960,043 S | 8/2022 | Desberg |
| 11,654,995 B2 | 5/2023 | Desberg et al. |
| RE49,608 E | 8/2023 | Chen |
| D1,002,764 S | 10/2023 | Desberg |
| D1,013,080 S | 1/2024 | Desberg |
| 12,214,841 B2 | 2/2025 | Desberg et al. |
| 12,227,257 B2 | 2/2025 | Chen |
| D1,068,552 S | 4/2025 | Desberg |
| D1,088,156 S | 8/2025 | Desberg |
| 2002/0008361 A1 | 1/2002 | Smith |
| 2002/0063006 A1 | 5/2002 | Kamen et al. |
| 2002/0149172 A1 | 10/2002 | Field et al. |
| 2003/0155167 A1 | 8/2003 | Kamen et al. |
| 2004/0005958 A1 | 1/2004 | Kamen et al. |
| 2004/0007399 A1 | 1/2004 | Heinzmann et al. |
| 2004/0007644 A1 | 1/2004 | Phelps, III et al. |
| 2004/0050611 A1 | 3/2004 | Kamen et al. |
| 2004/0055796 A1 | 3/2004 | Heinzmann et al. |
| 2004/0201271 A1 | 10/2004 | Kakinuma et al. |
| 2004/0262871 A1 | 12/2004 | Schreuder et al. |
| 2005/0126832 A1 | 6/2005 | Amsbury et al. |
| 2005/0134014 A1 | 6/2005 | Xie |
| 2006/0202439 A1 | 9/2006 | Kahlert et al. |
| 2006/0226675 A1 | 10/2006 | Dunn |
| 2006/0260857 A1 | 11/2006 | Kakinuma et al. |
| 2007/0051543 A1 | 3/2007 | Kamen et al. |
| 2007/0158117 A1 | 7/2007 | Alexander |
| 2007/0273118 A1 | 11/2007 | Conrad |
| 2008/0029985 A1 | 2/2008 | Chen |
| 2008/0105471 A1 | 5/2008 | Kamen et al. |
| 2008/0147281 A1 | 6/2008 | Ishii et al. |
| 2008/0284130 A1 | 11/2008 | Kamen et al. |
| 2009/0032323 A1 | 2/2009 | Kakinuma et al. |
| 2009/0055033 A1 | 2/2009 | Gansler et al. |
| 2009/0078485 A1 | 3/2009 | Gutsch et al. |

(56) References Cited

U.S. PATENT DOCUMENTS

| | | |
|---|---|---|
| 2009/0105908 A1 | 4/2009 | Casey et al. |
| 2009/0115149 A1 | 5/2009 | Wallis et al. |
| 2009/0200746 A1 | 8/2009 | Yamamoto |
| 2009/0315293 A1 | 12/2009 | Kosaka |
| 2010/0025139 A1 | 2/2010 | Kosaka et al. |
| 2010/0033315 A1 | 2/2010 | Kamen et al. |
| 2010/0114468 A1 | 5/2010 | Field et al. |
| 2010/0121538 A1 | 5/2010 | Ishii et al. |
| 2010/0168993 A1 | 7/2010 | Doi et al. |
| 2010/0207564 A1 | 8/2010 | Robinson |
| 2010/0217497 A1 | 8/2010 | Kamen et al. |
| 2010/0222994 A1 | 9/2010 | Field et al. |
| 2010/0225080 A1 | 9/2010 | Smith |
| 2010/0237645 A1 | 9/2010 | Trainer |
| 2011/0023652 A1 | 2/2011 | Cosby et al. |
| 2011/0131759 A1 | 6/2011 | An |
| 2011/0209929 A1 | 9/2011 | Heinzmann et al. |
| 2011/0220427 A1 | 9/2011 | Chen |
| 2011/0221160 A1 | 9/2011 | Shaw et al. |
| 2011/0238247 A1 | 9/2011 | Yen et al. |
| 2011/0282532 A1 | 11/2011 | Kosaka et al. |
| 2012/0035809 A1 | 2/2012 | Kosaka |
| 2012/0205176 A1 | 8/2012 | Ha et al. |
| 2012/0239284 A1 | 9/2012 | Field et al. |
| 2012/0290162 A1 | 11/2012 | Stevens et al. |
| 2012/0310464 A1 | 12/2012 | Kamen et al. |
| 2013/0010825 A1 | 1/2013 | Kamen et al. |
| 2013/0032422 A1 | 2/2013 | Chen |
| 2013/0032423 A1 | 2/2013 | Chen |
| 2013/0092461 A1 | 4/2013 | Kamen et al. |
| 2013/0099565 A1 | 4/2013 | Sachs et al. |
| 2013/0105239 A1 | 5/2013 | Fung |
| 2013/0186702 A1 | 7/2013 | Hadley et al. |
| 2013/0206493 A1 | 8/2013 | Larson et al. |
| 2013/0228385 A1 | 9/2013 | Chen |
| 2013/0238231 A1 | 9/2013 | Chen |
| 2013/0268145 A1 | 10/2013 | Kamen et al. |
| 2014/0091622 A1 | 4/2014 | Lucas et al. |
| 2014/0163855 A1 | 6/2014 | Field et al. |
| 2014/0188316 A1 | 7/2014 | Heinzmann et al. |
| 2014/0222267 A1 | 8/2014 | Stevens et al. |
| 2014/0339003 A1 | 11/2014 | Kamen et al. |
| 2015/0066276 A1 | 3/2015 | Nakashima et al. |
| 2015/0096820 A1 | 4/2015 | Strack |
| 2015/0175202 A1 | 6/2015 | MacGregor et al. |
| 2016/0121198 A1 | 5/2016 | Doerksen et al. |
| 2016/0129963 A1 | 5/2016 | Ying et al. |
| 2016/0185411 A1 | 6/2016 | Hadley et al. |
| 2016/0207584 A1 | 7/2016 | Ying et al. |
| 2016/0325803 A1 | 11/2016 | Waxman |
| 2017/0088211 A1 | 3/2017 | Jiang |
| 2017/0088212 A1 | 3/2017 | Edney |
| 2017/0106931 A1 | 4/2017 | Wood |
| 2017/0144718 A1 | 5/2017 | Tinaphong |
| 2017/0158275 A1 | 6/2017 | Yang |
| 2017/0166278 A1 | 6/2017 | Lu |
| 2017/0183053 A1 | 6/2017 | Zeng |
| 2017/0217529 A1 | 8/2017 | Chen |
| 2017/0253287 A1 | 9/2017 | Zuo |
| 2017/0297653 A1 | 10/2017 | Zheng |
| 2017/0309874 A1* | 10/2017 | Hsia ............ H01M 50/51 |
| 2017/0349230 A1 | 12/2017 | Doerksen et al. |
| 2018/0037290 A1 | 2/2018 | Ying |
| 2018/0037293 A1 | 2/2018 | Cher |
| 2018/0118297 A1* | 5/2018 | Lu ................ B62K 3/002 |
| 2018/0148120 A1* | 5/2018 | Yang ........... B62K 11/007 |
| 2018/0273130 A1 | 9/2018 | Ying |
| 2019/0077479 A1 | 3/2019 | Cher |
| 2019/0256164 A1 | 8/2019 | Yang et al. |
| 2019/0337585 A1* | 11/2019 | Ying ............ B62M 6/90 |
| 2023/0107027 A1* | 4/2023 | Bai ............ B62K 11/007 180/6.5 |
| 2024/0025507 A1 | 1/2024 | Desberg et al. |
| 2025/0171104 A1 | 5/2025 | Desberg et al. |

FOREIGN PATENT DOCUMENTS

| | | |
|---|---|---|
| CN | 101148184 A | 3/2008 |
| CN | 101157376 A | 4/2008 |
| CN | 100431906 C | 11/2008 |
| CN | 101353070 A | 1/2009 |
| CN | 201205442 Y | 3/2009 |
| CN | 201283206 Y | 8/2009 |
| CN | 201350326 Y | 11/2009 |
| CN | 201419008 Y | 3/2010 |
| CN | 201423155 Y | 3/2010 |
| CN | 201431762 Y | 3/2010 |
| CN | 101920728 A | 12/2010 |
| CN | 101565073 B | 1/2011 |
| CN | 201824899 U | 5/2011 |
| CN | 101513569 B | 7/2011 |
| CN | 301604610 S | 7/2011 |
| CN | 201978449 U | 9/2011 |
| CN | 202201103 U | 4/2012 |
| CN | 102514662 A | 6/2012 |
| CN | 102602481 A | 7/2012 |
| CN | 102616310 A | 8/2012 |
| CN | 103144715 A | 6/2013 |
| CN | 103246288 A | 8/2013 |
| CN | 203158157 U | 8/2013 |
| CN | 203381739 U | 1/2014 |
| CN | 104014123 A | 9/2014 |
| CN | 104029769 A | 9/2014 |
| CN | 203844875 U | 9/2014 |
| CN | 203996649 U | 12/2014 |
| CN | 204050913 U | 12/2014 |
| CN | 102514662 B | 4/2015 |
| CN | 102514663 B | 5/2015 |
| CN | 104859773 A | 8/2015 |
| CN | 104922891 A | 9/2015 |
| CN | 104922893 A | 9/2015 |
| CN | 104954476 A | 9/2015 |
| CN | 204699363 U | 10/2015 |
| CN | 105109595 A | 12/2015 |
| CN | 105151181 A | 12/2015 |
| CN | 105172959 A | 12/2015 |
| CN | 204864865 U | 12/2015 |
| CN | 204915961 U | 12/2015 |
| CN | 204952213 U | 1/2016 |
| CN | 205005082 U | 1/2016 |
| CN | 105329386 A | 2/2016 |
| CN | 105329387 A | 2/2016 |
| CN | 105329388 A | 2/2016 |
| CN | 105346606 A | 2/2016 |
| CN | 105346607 A | 2/2016 |
| CN | 105346643 A | 2/2016 |
| CN | 105346649 A | 2/2016 |
| CN | 105346650 A | 2/2016 |
| CN | 105346651 A | 2/2016 |
| CN | 105365963 A | 3/2016 |
| CN | 105416464 A | 3/2016 |
| CN | 105416468 A | 3/2016 |
| CN | 105416484 A | 3/2016 |
| CN | 105416485 A | 3/2016 |
| CN | 105416486 A | 3/2016 |
| CN | 205150007 U | 4/2016 |
| CN | 205150114 U | 4/2016 |
| CN | 205160428 U | 4/2016 |
| CN | 205186320 U | 4/2016 |
| CN | 205186321 U | 4/2016 |
| CN | 205186322 U | 4/2016 |
| CN | 105539659 A | 5/2016 |
| CN | 105539664 A | 5/2016 |
| CN | 105539665 A | 5/2016 |
| CN | 105539666 A | 5/2016 |
| CN | 105539695 A | 5/2016 |
| CN | 205256547 U | 5/2016 |
| CN | 105730576 A | 7/2016 |
| CN | 105905205 A | 8/2016 |
| CN | 205469471 U | 8/2016 |
| CN | 205554418 U | 9/2016 |
| CN | 205769843 * | 12/2016 |
| CN | 205906129 U | 1/2017 |
| CN | 206344927 U | 7/2017 |

(56) References Cited

FOREIGN PATENT DOCUMENTS

| | | | |
|---|---|---|---|
| CN | 206437133 U | * | 8/2017 |
| CN | 107512347 A | | 12/2017 |
| DE | 3411489 | | 10/1984 |
| DE | 44 04 594 | | 8/1995 |
| DE | 19642333 A1 | | 4/1998 |
| DE | 10209093 | | 9/2003 |
| DE | 202014010564 U1 | | 1/2016 |
| EP | 1791609 B1 | | 11/2011 |
| EP | 2987712 A1 | | 2/2016 |
| GB | 2529565 A | | 2/2016 |
| JP | 52-044933 | | 4/1977 |
| JP | 57-87766 | | 6/1982 |
| JP | 57-110569 | | 7/1982 |
| JP | 59-73372 | | 4/1984 |
| JP | 61-31685 | | 2/1986 |
| JP | 62-12810 | | 1/1987 |
| JP | 63-305082 | | 6/1987 |
| JP | 2-190277 | | 7/1990 |
| JP | 4-201793 | | 7/1992 |
| JP | 5-213240 | | 8/1993 |
| JP | 6-105415 | | 4/1994 |
| JP | 6-171562 | | 6/1994 |
| JP | 10-023613 | | 1/1998 |
| JP | H03-070015 | | 5/2000 |
| JP | 2001-178863 A | | 7/2001 |
| JP | 2004-359094 A | | 12/2004 |
| JP | 2005-094898 A | | 4/2005 |
| JP | 2005-335471 A | | 12/2005 |
| JP | 2006-001384 A | | 1/2006 |
| JP | 2006-001385 A | | 1/2006 |
| JP | 2006-008013 A | | 1/2006 |
| JP | 2009286323 A | * | 12/2009 |
| JP | 2010-030436 A | | 2/2010 |
| JP | 2010-030437 A | | 2/2010 |
| JP | 2010-030438 A | | 2/2010 |
| JP | 2010-030568 A | | 2/2010 |
| JP | 2010-030569 A | | 2/2010 |
| JP | 2010-035330 A | | 2/2010 |
| JP | 2010-254216 A | | 11/2010 |
| JP | 2011-131620 A | | 7/2011 |
| JP | 2016-527115 A | | 9/2016 |
| JP | 6086636 B1 | | 3/2017 |
| KR | 10-2008-0062416 A | | 7/2008 |
| TW | M516550 U | | 2/2016 |
| TW | M531423 U | | 11/2016 |
| WO | WO 86/05752 | | 10/1986 |
| WO | WO 89/06117 | | 7/1989 |
| WO | WO 96/23478 | | 8/1996 |
| WO | WO 98/46474 | | 10/1998 |
| WO | WO 00/75001 | | 12/2000 |
| WO | WO 2003/68342 | | 2/2003 |
| WO | WO 2004/07264 | | 1/2004 |
| WO | WO 2004/108513 A1 | | 12/2004 |
| WO | WO 2009/120157 A1 | | 10/2009 |
| WO | WO 2011/111123 A1 | | 6/2013 |
| WO | WO 2015/188599 A1 | | 12/2015 |
| WO | WO 2017/092101 A1 | | 6/2017 |
| WO | WO 2017/092163 | | 8/2017 |
| WO | WO 2017/210830 A1 | | 12/2017 |
| WO | WO-2018113070 A1 | * | 6/2018 |

OTHER PUBLICATIONS

Hovertrax by Inventist, https://web.archive.org/web/20130504083823/http:/www.kickstarter.com/projects/687658339/hovertrax, May 4, 2013, in 11 pages.

Google Trends—Web Search Interest: hoverboard-United States, Jan. 2004-Jul. 2016, Jul. 5, 2016.

Abeygunawardhana, et al., Vibration Suppression of Two-Wheel Mobile Manipulator Using Resonance-Ratio-Control-Based NullSpace Control, IEEE Transactions on Industrial Electronics, vol. 57, No. 12, pp. 4137-4146 (2010).

Azizan, et al., Fuzzy Control Based on LMI Approach and Fuzzy Interpretation of the Rider Input for Two Wheeled Balancing Human Transporter, 2010 8th IEEE International Conference on Control and Automation, Xiamen, 2010, pp. 192-197.

Banks, Alex, Everything You Need To Know About The Hoverboard Craze, highsnobiety.com, Oct. 14, 2015, http://www.highsnobiety.com/2015/10/14/hoverboard-history.

Bash, John D., How Do Self Balancing Scooters Work?, bestelectrichoverboard.com (Nov. 12, 2015), https://bestelectrichoverboard.com/hoverboard-faq/how-do-selfbalancing-scooters-work/.

Blankespoor, et al., Experimental Verification of the Dynamic Model for a Quarter Size Self-Balancing Wheelchair, Proceeding of the 2004 American Control Conference, Boston, MA, vol. 1, pp. 488-492.

Cardozo, et al., Prototype for a Self-Balanced Personal Transporter, 2012 Workshop on Engineering Applications (WEA), Bogota, 2012, pp. 1-6.

Chiu, et al., Design and implement of the self-dynamic controller for two-wheel transporter, 2006 IEEE International Conference on Fuzzy Systems, Vancouver, BC, 2006, pp. 480-483.

Choi, et al., Four and Two Wheel Transformable Dynamic Mobile Platform, 2011 IEEE International Conference on Robotics and Automation (ICRA), Shanghai, pp. 1-4.

Clark, et al. "Edgar, A Self-Balancing Scooter Final Report" (2005). (Divided in to 2 parts for submission).

CNET, Screenshots of "First look at the Razor Hovertrax 2.0 with Jake Krol" video, posted on Jul. 13, 2016, in 28 pages.

Coelho, et al., Development of a Mobile Two-Wheel Balancing Platform for Autonomous Applications, 15th International conference on Mechatronics and Machine Vision in Practice, Auckland, 2008, pp. 575-580.

Detrick, Ben, Celebrities On Scooters (Catch Them If You Can), The New York Times Aug. 15, 2015, http://www.nytimes.com/2015/08/16/fashion/cara-delevingne-justinbieber-meek-mill-stephen-curry-on-scooters.html?_r=%200.

Gotoh, Akio and Yamaoka, Masaaki, "Personal Mobility Robot," Robot, Issue No. 199, Mar. 2011, pp. 28-31.

Hornyak, Tim, Robot roller skates less bulky than Segway, www.cnet.com, Nov. 27, 2009.

Hu, et al., Self-balancing Control and Manipulation of a Glove Puppet Robot on a Two-Wheel Mobile Platform, 2009 IEEE/RSJ International Conference on intelligent Robots and Systems, St. Louis, MO, 2009, pp. 424-425.

Inventist, Inc. "Hovertrax Guide and Manual," 2014, in 15 pages.

"Inventist Inc., Solo Wheel, Orbit wheel @ Toy Fair 2013" https://www.youtube.com/watch?v=w8rHKCjLAWI, Feb. 10, 2013.

IO Hawk—Intelligent Personal Mobility Device, https://web.archive.org/web/20150718144409/http://iohawk.com, Jul. 18, 2015, in 9 pages.

Kantrowitz, Alex, Everything You Need To Know About The Hoverboard Craze, buzzfeed.com Aug. 27, 2015, https://www.buzzfeed.com/alexkantrowitz/a-crash-course-inhoverboards?utm_term=.qw5Z9x47Z#.oc1W1v56W.

Kawaji, S., Stabilization of Unicycle Using Spinning Motion, Denki Gakkai Ronbushi, D, vol. 107, Issue 1, Japan (1987), pp. 21-28.

Kickstarter, Comments on Hovertrax by Inventist, https://www.kickstarter.com/projects/687658339/hovertax/comments, apparently available Oct. 2014, in 16 pages.

Kickstarter, "Hovertrax by Inventist," https://web.archive.org/web/20130504083823/http://kickstarter.com/projects/687658339/hovertrax?, May 4, 2013, in 11 pages.

Kim, et al., Development of a Two-Wheeled Mobile Tilting & Balancing (MTB) Robot, 2011 11th International Conference on Control, Automation and Systems (ICCAS), Gyeonggi-do, 2011, pp. 1-6.

Li, et al., A coaxial couple wheeled equilibrium robot with T-S fuzzy equilibrium control, Industrial Robot: An International Journal, vol. 38, Issue 3, pp. 292-300, 2011.

Li, et al., Controller Design of a Two-Wheeled Inverted Pendulum Mobile Robot, 2008 IEEE International Conference on Mechatronics and Automation, Takarnatsu, pp. 7-12.

(56) References Cited

OTHER PUBLICATIONS

Li, et al., Mechanical Design and Dynamic Modeling of a TwoWheeled Inverted Pendulum Mobile Robot, Proceedings of the 2007 IEEE International Conference on Automation and Logistics, Jinan, 2007, pp. 1614-1619.

Lin, et al., Adaptive Robust Self-Balancing and Steering of a Two-Wheeled Human Transportation Vehicle, 62 J Intell Robot Syst, pp. 103-123 (2011) (first published online Aug. 27, 2010).

Murphy, Mike, Everything You've Ever Wanted To Know About The Hoverboard Craze, Quartz Nov. 11, 2015, http://qz.com/495935/everything-youve-ever-wanted-to-know-aboutthe-hoverboard-craze/.

Quick, Darren, Nissan Joins Personal Mobility Field with "Segwayskis", http:///www.gizmag.com/nissan-personal-mobility-device/13210/, New Atlas, Urban Transport, Oct. 27, 2009, pp. 1-9.

Quirk, Trevor, "Why you shouldn't expect a hoverboard any time soon," Christian Science Monitor, URL~https://www.csmonitor.com/Science/2012/0213/Why-you-shouldn-t-expect-a-hoverboardany-time-soon, Feb. 13, 2012, Web. Jul. 5, 2016, pp. 1-5.

Robinson, Mandy, Hoverboard Black Friday Sales: Best Places To Get One Before Christmas, inquisitr.com, Nov. 24, 2015, http://www.inquisitr.com/2589773/hoverboard-black-friday-sales-best-10107994 - iv - places-to-get-one-before-christmas/.

Sasaki, et al., Forward and Backward Motion Control of Personal Riding-type Wheeled Mobile Platform, Proceedings of the 2004 IEEE International Conference on Robotics and Automation, vol. 4, pp. 3331-3336.

Sasaki, Makiko, et al., "Steering Control of the Personal Riding-type Wheeled Mobile Platform (PMP)," vol. 4 of 4, IEEE, RSJ International Conference on Intelligent Robots and Systems, Aug. 2-6, 2005, in 60 pages.

Schoonwinkel, A., Design and Test of a Computer-Stabilized Unicycle, Stanford University (1988), UMI Dissertation Services.

Seo, et al., Simulation of Attitude Control of a Wheeled Inverted Pendulum, International Conference on Control, Automation, and Systems, 2007, Seoul, pp. 2264-2269.

Sino US Times, Interview of Mr. Ying, http://www.chic-robot.com/index.php/news/info/54, Jan. 26, 2016, in 15 pages.

'They're Completely Different Products': IO Hawk President John Soibatian Not Concerned About Infringing Hovertrax Patent, hoverguru.com (2015), http://hoverguru.com/posts/theyrecompletely-different-products-io-hawk-president-john-soibatian-notconcerned-about-infringing-on-hovertrax-patent/ (last visited Dec. 27, 2016).

Tran, Long, "More Weird Ways to Skate the Streets," Yanko Design, Sep. 7, 2007.

Tsai, et al., Development of a Self-Balancing Human Transportation Vehicle for the Teaching of Feedback Control, IEEE Transactions on Education, vol. 52, No. 1, Feb. 2009.

Tsai, et al., Intelligent Adaptive Motion Control Using Fuzzy Basis Function Networks for Self-Balancing Two-Wheeled Transporters, 2010 IEEE Conference on Fuzzy Systems, Barcelona, 2010 pp. 1-6.

Vos, D., Dynamics and Nonlinear Adaptive Control of an Autonomous Unicycle, Massachusetts Institute of Technology, 1989.

Vos, D., Nonlinear Control of an Autonomous Unicycle Robot: Practical Issues, Massachusetts Institute of Technology, 1992.

Wells, Georgia, What It's Like To Have Wheels For Feet: Test Driving The Latest 'Hoverboards', The Wall Street Journal (Oct. 28, 2015), http://www.wsj.com/articles/what-its-like-to-have-wheels-forfeet-test-driving-the-latest-hoverboards-1446055640.

Yu, et al., Development of a Omni-directional Self-Balancing Robot Wheelchair, Journal of Korea Robotics Society, vol. 8, Iss. 4, pp. 229-237 (2013).

\* cited by examiner

ELECTRIC BALANCE VEHICLES

CROSS REFERENCE

This application is a continuation of U.S. patent application Ser. No. 15/941,505, filed Mar. 30, 2018, which claimed priority under the relevant sections of 35 U.S.C. § 119 to U.S. Patent Application No. 62/552,963, filed Aug. 31, 2017, and which also claimed priority under the relevant sections of 35 U.S.C. § 119 to Chinese Patent Application Nos. 201720344437.6, filed Apr. 1, 2017; 201720344816.5, filed Apr. 1, 2017; 201720344852.1, filed Apr. 1, 2017; and 201730105822.0, filed Apr. 1, 2017. The entire contents of each of the above-identified applications is hereby incorporated by reference herein.

BACKGROUND

Field

This disclosure relates to personal mobility vehicles, such as two-wheeled electric balance vehicles.

Certain Related Art

An electric balance vehicle is also known as a self-balancing scooter or "hoverboard." Electric balance vehicles can provide a portable, stowable, and environmentally friendly means of transport and entertainment.

SUMMARY OF CERTAIN FEATURES

Some electric balance vehicles include movable (e.g., rotatable) platforms on which a user can place his or her feet. The platforms provide support to the user to ride the electric balance vehicle. Some electric balance vehicles are of the two-wheel type and include two wheels with two rotatable platforms therebetween. The user can move the platforms to operate the electric balance vehicle, such as to advance, retreat, stop and/or turn the electric balance vehicle. For example, the user can rotate one of the platforms relative to the other to perform a turn and/or can rotate both of the platforms relative to the riding surface (e.g., the ground) to move forward or backward. Some embodiments use dynamic stabilization to aid in maintaining balance and operation of the electric balance vehicle. For example, balance and operation of the vehicle can be maintained by controlling the electric balance vehicle's wheel assemblies, which can include motors, such as hub motors.

The electric balance vehicle can include an axle assembly. In various embodiments, the user can stand on the electric balance vehicle and the weight of the user can be transferred through the axle assembly to the first and second wheel assemblies of the electric balance vehicle. The axle assembly can include a support axle. The support axle can extend substantially and/or entirely between the first and second wheel assemblies. The support axle can comprise an elongate member, such as a tube or pipe. The support axle can be made of any material suitable to provide support to a user standing on the electric balance vehicle (e.g., steel, aluminum, hard plastic, composite material or otherwise). A first end of the support axle can be coupled with the first wheel assembly and a second end of the support axle can be rotatably coupled with a frame. The frame can be coupled with the second wheel assembly.

The axle assembly can have advantages over certain other designs that have an "inner cover" (e.g., an inner cover that is used as the internal framework of the entire balance vehicle, is fixed between a top cover and a bottom cover, has a first inner cover and a second inner cover that are rotatable relative to each other and/or has a generally hourglass or figure-eight shape when viewed from above). The inner cover can take up a large volume within the structure of the electric balance vehicle. The inner cover can add significantly to the bulk and weight of the electric balance vehicle. The inner cover can be complicated in shape and/or structure. If the inner cover is manufactured from a lightweight material (e.g., aluminum), the inner cover can be overly expensive, insufficiently rigid and/or difficult to produce. If the inner cover is manufactured from a stronger material (e.g., steel), the inner cover can be overly heavy and/or prone to corrosion. If the inner cover is formed by a casting process, the inner cover can be fragile under stress and/or prone to fatigue failure. If the inner cover is formed by a machining process (e.g., milling), the inner cover can be overly expensive and/or time consuming to produce. Vehicles with an inner cover typically have a central rotating mechanism that has a large diameter, is bulky and is inconvenient to grasp. Various embodiments of the electric balance vehicle do not include an inner cover.

Some embodiments of the electric balance vehicle can include a first pedal housing and a second pedal housing. The first and second pedal housings can be configured to receive a respective foot of the user and be rotatable relative to each other. The first pedal housing can be fixed with respect to the support axle and the second pedal housing can be rotatable with respect to the support axle. A fixed carrier can fixedly couple the support axle and the first pedal housing. The frame and/or a rotatable carrier can rotatably couple the second pedal housing with the support axle, such that the second pedal housing can rotate with respect to the first pedal housing and the support axle. In some embodiments, the frame is positioned within only the second pedal housing and not within the first pedal housing.

In some embodiments of the electric balance vehicle, the user can operate the electric balance vehicle using dynamic stabilization by controlling rotation of the first and second pedal housings relative to the axle assembly and/or a ground surface. The electric balance vehicle can include a first controller for controlling the first wheel assembly and a second controller for controlling the second wheel assembly. A first inertial sensor can be provided in the first pedal housing and a second inertial sensor provided in the second pedal housing. The first inertial sensor can be configured to sense rotation of the first pedal housing and generate a first sensing signal. The second inertial sensor can be configured to sense rotation of the second pedal housing and generate a second sensing signal. The first controller can operate the first wheel assembly according to the first sensing signal. The second controller can operate the second wheel assembly according to the second sensing signal. For example, the user can operate the second wheel assembly by rotating the second pedal housing forward or backward with corresponding acceleration of the second wheel assembly being signaled by the second controller based on the second sensing signal from the second inertial sensor. Similarly, the user can operate the first wheel assembly by rotating the first pedal housing forward or backward with corresponding acceleration of the first wheel assembly being signaled by the first controller based on the first sensing signal from the first inertial sensor. Thus, movement of the electric balance vehicle and/or balancing of the user on the electric balance vehicle can be controlled by the user.

In some embodiments, a limit structure can inhibit or stop rotation of the frame and/or second pedal housing with respect to the support axle. This can enable one or more signal or power cables to extend between the first and second pedal housings without being squeezed or damaged by the rotation of the first and second pedal housings. For example, the limit structure can be included in the rotatable carrier or frame. The rotatable carrier or frame can include a sleeve having a slot. The rotatable carrier or frame can be positioned on the support axle. The sleeve can be configured to rotate with respect to the support axle, such as by being fixed with the frame and/or second pedal housing. A protrusion can be positioned in and/or through the slot. The protrusion can be fixedly engaged with the support axle. Rotation of the sleeve causes the protrusion to encounter an end of the slot. Thus, rotation of the frame and/or second pedal housing can be inhibited or stopped depending on the length and position of the end of the slot and the protrusion.

In some embodiments of a two-wheel electric balance car, a first wheel assembly and the second wheel assembly are located at opposite ends of the balance car. The wheels can be symmetrically located on the opposite ends. A first pedal housing and a second pedal housing are rotatably and symmetrically disposed between the first wheel and second wheel assemblies. A horizontal axle extends through an inner cavity of the first pedal housing to an outer end of the first pedal housing. An opposite end of the horizontal axle extends into an inner chamber of the second pedal housing. An axle of the first wheel assembly or an axle of the second wheel assembly is rotatably coupled with the outer end of the horizontal axle.

According to some embodiments, the axle of the first wheel assembly or the second wheel assembly is fixedly mounted on a wheel carrier which is rotatably fitted at the end of the horizontal axle.

According to some embodiments, the end of the horizontal axle is equipped with a rotating sleeve which can rotate on the horizontal axle. An outer side of the rotating sleeve is equipped with a rotating carrier, and the wheel carrier is fixedly assembled with the rotating carrier.

According to some embodiments, a limiting sleeve is provided on the rotating sleeve and the rotating carrier. A limit hole is provided with a horizontal axle limit screw for limiting rotation of the limiting sleeve and rotating carrier.

According to some embodiments, the end of the horizontal axle is equipped with a rolling bearing, and an outer side of the rolling bearing is equipped with a rotating carrier. The wheel carrier is fixedly assembled with the rotating carrier.

According some embodiments, said rotating bearing is sleeved on said rotating sleeve or rolling bearing.

According to some embodiments, the rotating bearing is held on the rotating sleeve or rolling bearing through a semicircular groove.

According to some embodiments, said rotating carrier extends to flanges on both sides of said horizontal axle. The wheel carrier is fastened to the flange.

According to some embodiments, the rotating flange and the wheel carrier are provided with a plurality of corresponding fastening connection holes. The plurality of fastening connection holes are distributed in the axial direction of the horizontal axle.

According to some embodiments, the middle part of the wheel carrier is provided with a socket, and the end of the horizontal axle extends into socket.

According to some embodiments, the axle of second wheel assembly is inserted into the socket and locked by a pin to the wheel carrier and the horizontal axle.

According to some embodiments, the socket has a through hole forming a wire passage.

According to some embodiments, the axle of the first wheel assembly and the axle of the second wheel assembly are coaxial with the horizontal axle.

In some embodiments of a two-wheel electric balance car, a first wheel assembly and a second wheel assembly are symmetrically located at opposite ends of the balance car. A first pedal housing and a second pedal housing are rotatably and symmetrically disposed between the first wheel assembly and the second wheel assembly. A horizontal axle has one end of that is extended to an outer end of the first pedal housing through an inner cavity of the first pedal housing and the other end of the horizontal axle is extended through an inner cavity of the second pedal housing to an outer end of the second pedal housing. An axle of the first wheel assembly or an axle of the second wheel assembly is fixedly mounted at the end of the horizontal axle.

According to some embodiments, the horizontal axle is a hollow shaft. The axle of the first wheel assembly or the axle of the second wheel assembly is inserted into the hollow shaft and pinned to the horizontal axle.

According to some embodiments, the axle of the first wheel assembly or/and the second wheel assembly are hollow shafts, the ends of which are inserted into the horizontal axle and pin-locked in place.

According to some embodiments, the horizontal axle inserts into the axle of the first wheel assembly.

According to some embodiments, a wire slit is provided at one end of the axle of the first or second wheel assemblies.

According to some embodiments, the pinned connection of the axle with the first or second wheel assemblies includes at least two pins spaced at intervals.

According to some embodiments, said first pedal housing is fixed with said horizontal axle and second pedal housing can rotate relative to with the horizontal axle.

According to some embodiments, where at least one fixed carriers provided on said horizontal axle. The first pedal housing is assembled with the fixed carrier.

According to some embodiments, the first pedal housing includes a first upper shell and a first lower shell. The first upper shell is carried by the fixed carrier, and the first upper shell and the first lower shell are assembled together.

According to some embodiments, the horizontal axle is provided with at least two rotary sleeves that are rotatable on the horizontal axle. The outside of each rotating sleeve is equipped with a rotating bearing and the second pedal housing is assembled with the rotating bearing.

According to some embodiments, the second pedal housing has a second upper shell and a second lower shell. The second upper shell is carried by the rotating bearing. The second upper shell and the second lower shell are joined assembled together around the horizontal axle.

The preceding Summary is provided solely as a high-level discussion of certain aspects of some embodiments within the scope of this disclosure. Neither the preceding summary nor the following Detailed Description and the associated drawings limit or define the scope of protection. The scope of protection is defined by the claims.

BRIEF DESCRIPTION OF THE DRAWINGS

Certain features, aspects, and advantages are described below with reference to drawings of an example embodiment. The drawings are intended to illustrate, but not to limit, the present disclosure. Some embodiments do not include all of the features shown in the drawings. No feature is essential, critical, or indispensable.

DETAILED DESCRIPTION OF CERTAIN EMBODIMENTS

Various embodiments of the electric balance vehicle will now be discussed. Although certain specific embodiments of the electric balance vehicle are described, this disclosure is not limited to only these embodiments. On the contrary, the described embodiments are merely illustrative. This disclosure is intended to also cover alternatives, modifications and equivalents. Furthermore, in the following description, numerous specific details are set forth in order to provide a thorough understanding of the disclosed technology to one of ordinary skill in the art. However, embodiments may be practiced without these specific details. So as to not unnecessarily obscure aspects of certain embodiments of the present technology, in some instances, well known methods and mechanisms have not been described in detail.

Figure 1:
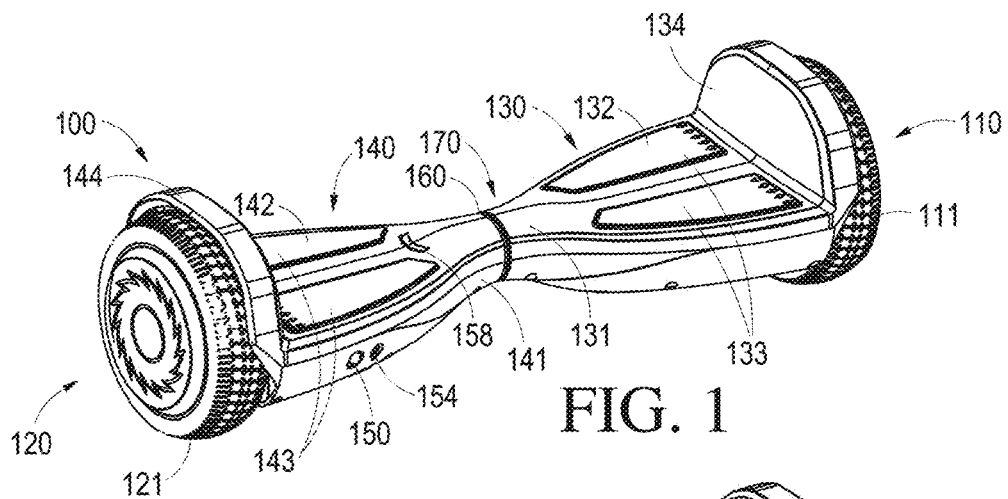
FIG. 1 is a perspective view of an embodiment of an electric balance vehicle.
Figure 16:
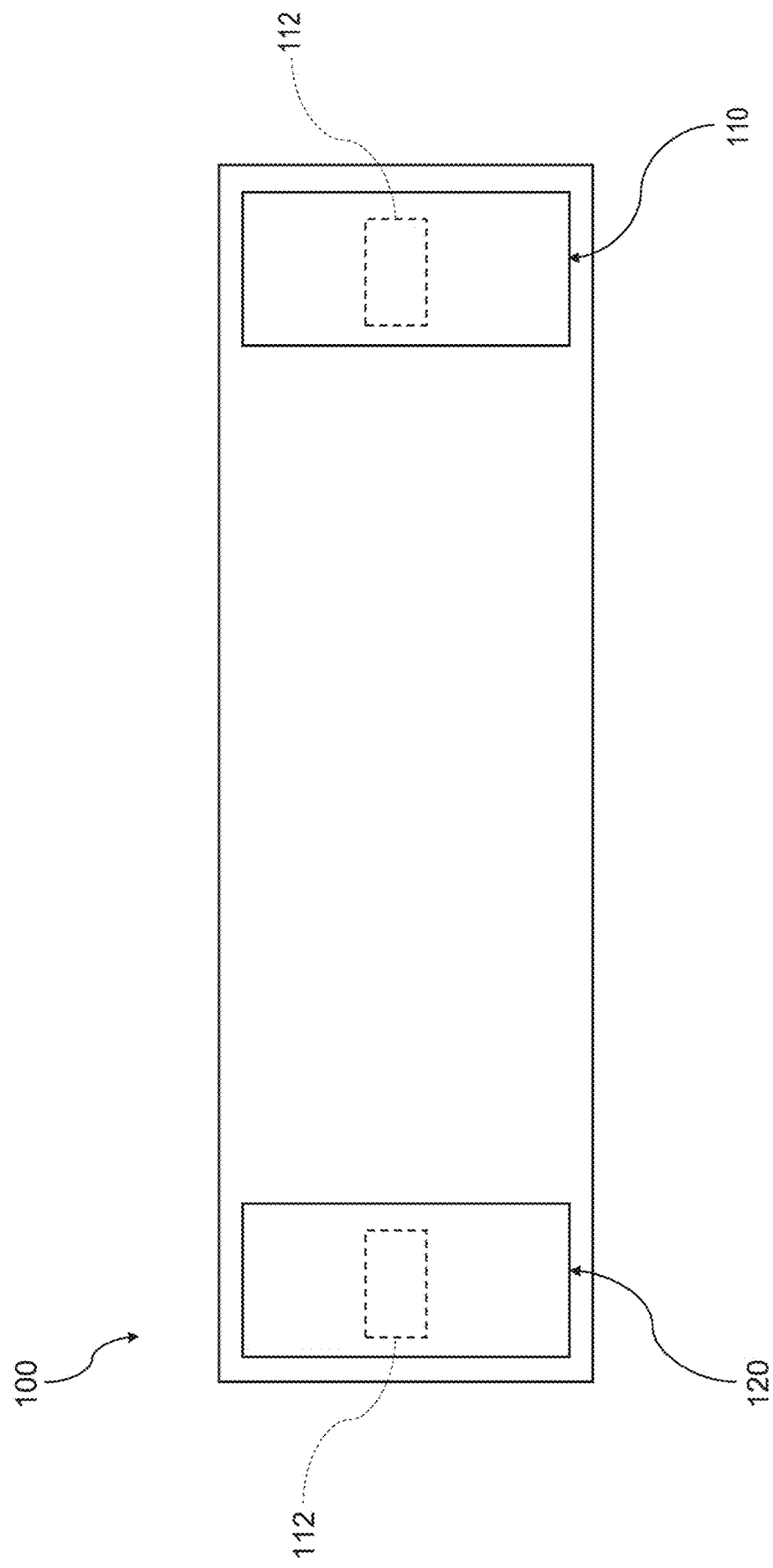
FIG. 16 is a schematic top view of the electric balance vehicle of FIG. 1.

FIG. 1 illustrates an electric balance vehicle 100. The electric balance vehicle 100 includes a first wheel assembly 110 and a second wheel assembly 120 on opposite ends of the electric balance vehicle 100. In some embodiments, one or each of the first wheel assembly 110 and the second wheel assembly 120 includes a drive motor 112 (illustrated schematically in FIG. 16) and/or a brake (not shown). The motor and/or the brake can be located within the wheels 111, 121. A tire (e.g., a rubber tire) can be mounted on an outer side of a rim of each of the wheel assemblies 110, 120.

As illustrated, a first pedal housing 130 and a second pedal housing 140 can be positioned between the first and second wheel assemblies 110, 120. The first and second pedal housings 130, 140, respectively, comprise a platform 132, 142. The platforms 132, 142 can be configured to support a user, such that the user can place a respective foot on each of the platforms 132, 142. The first pedal housing 130 and the second pedal housing 140 can be rotatable relative to each other. In certain variants, a driver can control the electric balance vehicle 100 by rotating the platforms 132, 142 during use. The platforms 132, 142 can comprise anti-sliding surfaces 133, 143 (e.g., textured rubber or silicone pads) such that the user can maintain his or her feet on the platforms 132, 142.

In some embodiments, the first and second pedal housings 130, 140 each comprise a tapered region 131, 141. The tapered regions 131, 141 can terminate at a neck or a central region 170. The central region 170 can include a bushing 160. The bushing 160 can be located between the first and second pedal housings 130, 140. In some embodiments, the tapered regions 131, 141 have a substantially or completely circular axial cross-section at the central region 170. In some embodiments, substantially no gaps or projections are provided between the first and second pedal housings 130, 140 during rotation of the first pedal housing 130 with respect of the second pedal housing 140 and/or vice versa. In some implementations, the circumference of the tapered regions 131, 141 is configured to be graspable by a user's hand for lifting and carrying the electric balance vehicle 100. In some embodiments of the electric balance vehicle 100, the first and second pedal housings, 130, 140, are generally symmetrical about the central region 170, as illustrated in FIG. 1.

The first and second pedal housings 130, 140 can comprise fender portions 134, 144. The fender portions 134, 144 can extend upwards (e.g., in a vertical direction) from the platforms 132, 142. The fender portions 134, 144 can provide a barrier between the platforms 132, 142 and the wheel assembly 110, 120. In some embodiments, the fenders 134, 144 can include a lip at least partially encasing or shielding wheels 111, 121 of the wheel assemblies 110, 120, respectively. For example, as shown, the lip can extend outwardly over a portion of the wheels, 111, 121.

The electric balance vehicle 100 can comprise electrical interfaces. For example, the electric balance vehicle 100 can have a power switch 150 and/or a charging interface 154. The switch 150 and charging interface 154 can be positioned on either of the first or second pedal housings 130, 140. In some variants, the switch 150 is on the first pedal housing 130 and the interface 154 is on the second pedal housing 140 or vice versa. The power switch 150 can be configured to turn on and off the electric balance vehicle 100. The charging interface 154 can be configured to provide an electrical power input, such as to charge a power source (e.g., a battery 270) of the electric balance vehicle 100. The power switch 150 and/or the charging interface 154 can extend through an outer wall of the second pedal housing 140. Some embodiments of the electric balance vehicle 100 can include a power meter or electrical status indicator 158. For example, the indicator 158 can comprise one or more lights (e.g., LEDs). The lights can be arranged and/or colored to indicate charging status and/or power level of the electric balance vehicle 100.

The first and second pedal housings 130, 140 can comprise many different decorative shapes and sizes. The pedal housings 130, 140 can include various decorations 205, such as headlights and light strips. In some embodiments, the first and second pedal housings 130, 140 are plastic, such as being manufactured from injection molded hard plastic.

Figure 2:
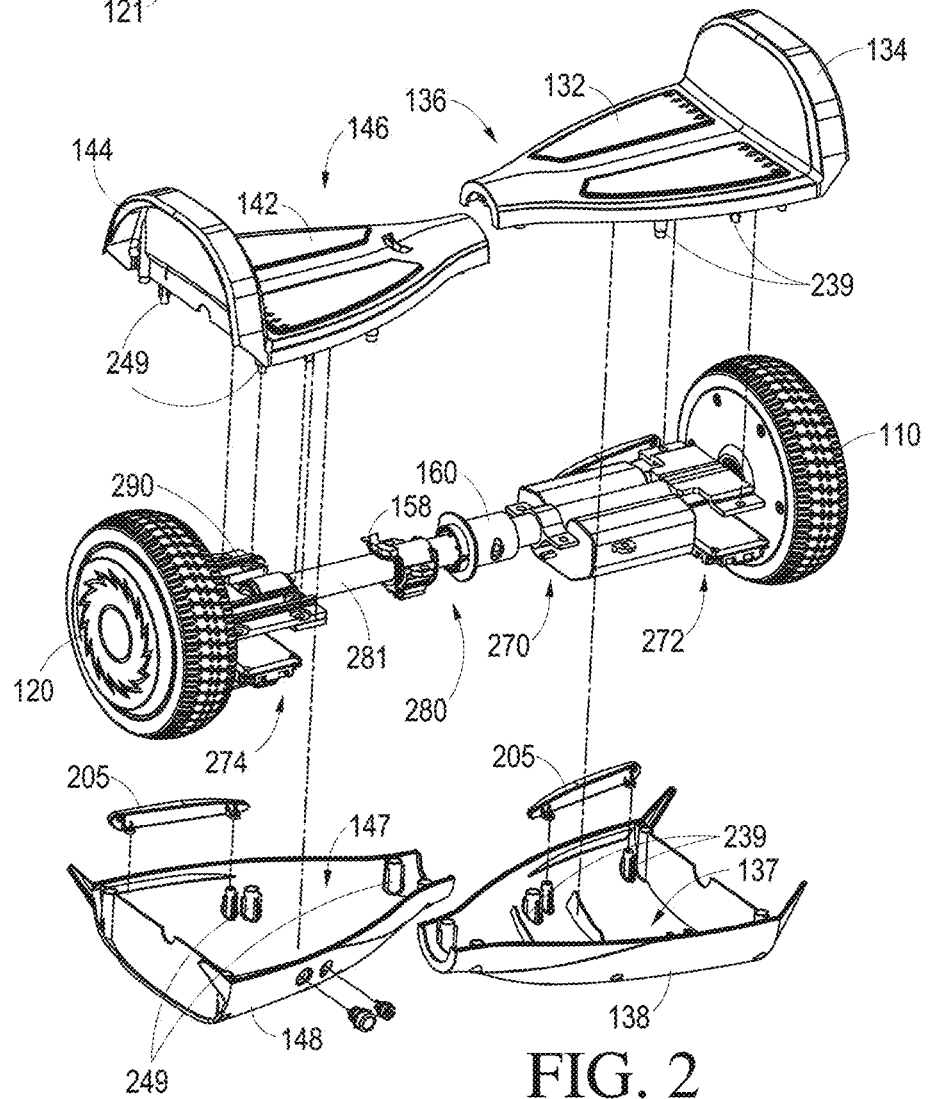
FIG. 2 is a partial exploded view of the electric balance vehicle of FIG. 1.

The first pedal housing 130 can comprise an upper housing 136 and a lower housing 138. The upper housing 136 and the lower housing 138 can be coupled together to enclose or partially enclose an interior space or inner cavity 137. In some embodiments, the upper housing 136 is abutted against and/or secured to (e.g., with screws, bolts, rivets, hooks, or otherwise) the lower housing 138. In an assembled state, the first pedal housing 130, formed of the upper and lower housings 136, 138, can have the appearance of an integral body. In some embodiments, the upper housing 136 and the lower housing 138 can be connected together with a plurality of fasteners such as screws or bolts. For example, the screws can be extended from a lower side of the lower housing 138 and extended into the upper housing 136. In some embodiments, the upper housing 136 is coupled with the lower housing 138 at any of corresponding fastener stems 239 extending from the upper and/or lower housings 136, 138. The connection relationship of the upper and lower housings 136, 138 is represented with dotted lines in FIG. 2.

Similarly, the second pedal housing 140 can comprise an upper housing 146 and a lower housing 148 that can be coupled together to enclose an interior space or cavity 147. In some embodiments, the upper housing 146 and the lower housing 148 are connected together with fasteners such as screws or bolts, such as at any of corresponding fastener stems 249 extending from the upper and/or lower housings 146, 148. In an assembled state, the second pedal housing 140 formed by the upper and lower housings 146, 148 can have the appearance of an integral body. The connection relationship of the upper and lower housings 146, 148 is represented with dotted lines in FIG. 2.

The electric balance vehicle 100 can comprise an axle assembly 280. In some embodiments, the axle assembly 280 extends between the first wheel assembly 110 and the second wheel assembly 120. The axle assembly 280 can be configured to provide support to the platforms 132, 142. The platforms 132, 142 can be located above the axle assembly 280 and/or in contact (e.g., direct or indirect) with the axle assembly 280. In some implementations, during use, the user's weight can rest on the platforms 132, 142 and be distributed across the axle assembly 280 and wheels 111, 121. The axle assembly 280 can be partially or entirely within the inner cavities 137, 147 of the first and second pedal housings 130, 140.

The axle assembly 280 can include an axle 281 and a frame 290. A first end of the axle 281 can be coupled with the first wheel assembly 110. The first end of the axle 281 can be inside or outside of the first pedal housing 130. A second end of the axle 281 can be coupled with the frame 290. The second end of the axle 281 can be inside or outside of the second pedal housing 140. An opposite end of the frame 290 from the second end of the axle 281 can be coupled with the second wheel assembly 120, as described further below. In various embodiments, the frame 290 is configured to rotate relative to the axle 281, as will be discussed in more detail below.

In some embodiments, the axle 281 is a tube, pipe, bar or other elongate structure. The axle 281 can be continuous (e.g., without interruptions or gaps) from end to end. The axle 281 can extend substantially completely between the first and second wheel assemblies 110, 120. The axle 281 can extend continuously between the frame 290 and the first wheel assembly 110 without any discontinuities or breaks in structure, such as at its central region (e.g., at the neck or central region 170 of the vehicle 100). In some embodiments, a ratio of a length of the axle 281 relative to a total length of the electric balance vehicle 100 (including the first and second wheel assemblies 110, 120) is approximately 0.7. In some embodiments, the ratio of the length of the axle 281 to the total length of the vehicle 100 is between 0.6 and 0.8. In some embodiments, the ratio of the length of the axle 281 to the total length of the vehicle 100 is between 0.5 and 0.9. In some embodiments, a ratio of the length of the frame 290 relative to the length of the axle 281 is approximately 0.19. In some embodiments, the ratio of the length of the frame 290 to the length of the axle 281 is between 0.1 and 0.3. The axle 281 can be configured to support the weight of the user, such as to transfer the weight without substantial bending at the longitudinal midpoint of the axle 281. The axle 281 can be made from a steel tube or rod. The axle 281 can be made of an alloy, such as an aluminum alloy. The alloy can be treated with a stretching process that imparts increased strength and/or toughness.

The electric balance vehicle 100 can include a power source, such as the battery 270. The battery 270 can be configured to be positioned within the inner cavity 137 of the first pedal housing 130, as illustrated. In some variants, the battery 270 is positioned within the inner cavity 147 of the second pedal housing 140. In some embodiments, both the first and second pedal housings 130, 140 include batteries to thereby increase the power capacity and improve the distance and cruising ability of the electric balance vehicle 100.

In various embodiments, the electric balance vehicle 100 includes control circuitry. The electric balance vehicle 100 can comprise a first controller 272 and a second controller 274 for controlling and operating the movements of the electric balance vehicle 100. In other embodiments, the electric balance vehicle 100 can comprise a single controller with similar functionality as the first and second controllers 272, 274 and located in a single pedal housing. In the illustrated embodiment, the first controller 272 is configured to control the first wheel assembly 110 and the second controller 274 is configured to control second wheel assembly 120. The first and second controllers 272, 274 can be configured to operate and/or power corresponding drive motors of the first and second wheel assemblies 110, 120. Power and/or signal conduits (e.g., electrical cables) can extend between the first wheel assembly 110, battery 270, and first controller 272 and/or between the second wheel assembly 120, battery 270 and second controller 274. In some embodiments, a power and/or signal cable can extend between the first and second controllers 272, 274 such as to coordinate control of the first and second wheel assemblies 110, 120.

The electric balance vehicle 100 can include one or more inertial sensors (e.g., gyroscopes and/or accelerometers) for sensing the rotation of the first and second pedal housings 130, 140. There can be two or more groups of inertial sensors provided in the first pedal housing and the second pedal housing 130, 140, respectively. In some embodiments, the inertial sensors are on the same circuit boards as the controllers 272, 274.

The controllers 272, 274 can receive data signals from the inertial sensors. Data signals from the inertial sensors can be used for controlling rotation of the first and second wheel assemblies 110, 120, as discussed further below. Each of the first and second controllers 272, 274 can be communicatively coupled to a set or single inertial sensor and operate according to the data signal from that set or single inertial sensor.

Figure 3:
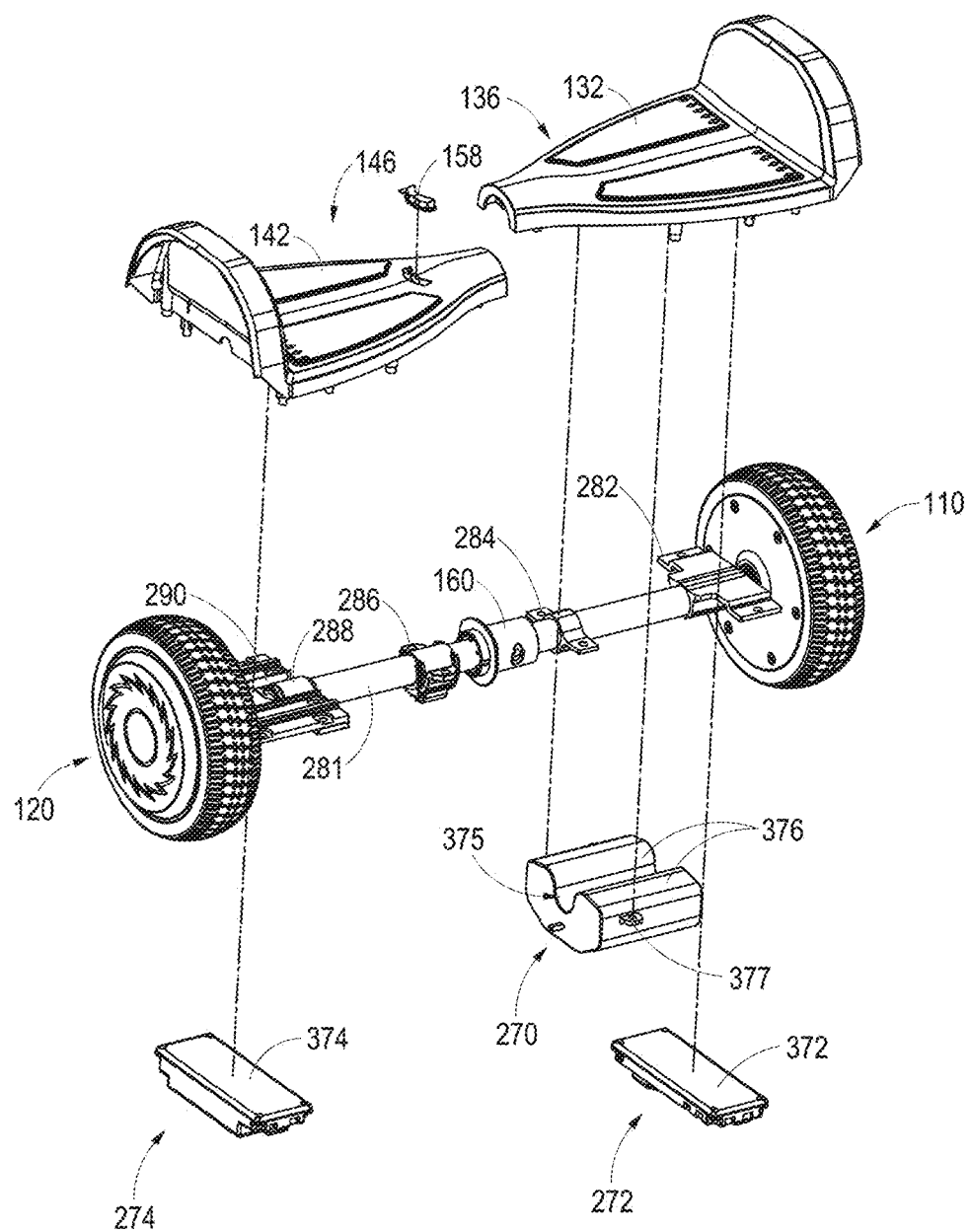
FIG. 3 is another partial exploded view of the electric balance vehicle of FIG. 1.

The first and second controllers 272, 274 can each be located at a lower side of the axle 281. Such an assembly relationship is shown in FIG. 3 with dotted lines. The first and second controllers 272, 274 can each be connected with either of the upper or lower housings of the pedal housings 130, 140. In some embodiments, the first and second controllers 272, 274 can each be encased in respective controller housings 372, 374.

Figure 4:
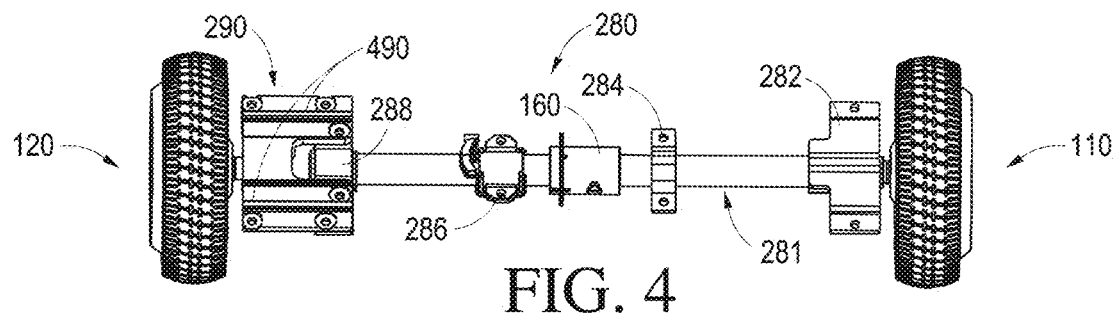
FIG. 4 is a front view of an axle assembly of the electric balance vehicle of FIG. 1, with portions of the axle assembly in a tilted configuration.

As shown in FIGS. 3 and 4, the battery 270 used for supplying power to powered components of the electric balance vehicle 100 can be configured to reduce vertical space. For example, the battery 270 can be configured to nest with the axle 281. In some embodiments, the battery 270 can include two upper extensions 376 and a lateral groove 375 formed between the two upper extensions 376. The lateral groove 375 can be positioned when assembled such that the axle 281 is located within the lateral groove 375. This arrangement can have space-saving advantages and thereby the volume of the battery 270 may be increased to accommodate additional battery power (e.g., additional electrochemical cells). In some embodiments, the battery 270 can be provided underneath the axle 281 with the two upper extensions 376 extending upwards on alternate sides of the axle 281. The battery 270 can be coupled with the axle 281 and/or the first pedal housing 130 by a flange 377 and suitable mechanical fasteners.

In various embodiments, at least one of the housings 130, 140 rotate relative to the axle 281. For example, one of the pedal housings 130, 140 can be configured to rotate relative to the axle 281 and one of the housings 130, 140 can be rotationally fixed relative to the axle 281. In some embodiments, the axle 281 is connected with a first fixed carrier 282 and/or a second fixed carrier 284. The first and second fixed carriers 282, 284 can be fixedly coupled with the axle 281. For example, carriers 282, 284 can be sleeved on the axle 281, such as fitting over and/or around the axle 281. In some embodiments, the carriers 282, 284 are held in place with a press fit, pin, weld or any other suitable mechanical fastener (e.g., U-bolted). The first fixed carrier 282 can be fixedly coupled with the first end of the axle 281. For example, the first carrier 282 can be positioned adjacent the wheel assembly 110. The second fixed carrier 284 can be fixed between the first fixed carrier 282 and the central region 170. The first upper housing 136 can be provided on (e.g., vertically over) one or both of the first and second fixed carriers 282, 284. In some embodiments, the first upper housing 136 is fastened to one or both of the carriers 282, 284. In some embodiments, the first upper housing 136 and the platform 132 are supported by one or both of the first and second fixed carriers 282, 284. In some embodiments, the battery 270 and/or the axle 281 can provide additional support to the first upper housing 136 and the platform 132. In some embodiments, the first and second fixed carriers 282, 284 can be positioned within the inner cavity 137 of the first pedal housing 130, when the upper and lower housings 136, 138 are assembled together.

In some embodiments, the axle 281 is provided thereon with a first rotatable carrier 288 and/or a second rotatable carrier 286. The first and second rotatable carriers 288, 286 can be rotatably assembled with the axle 281. The first rotatable carrier 288 can be rotatably coupled with the second end of the axle 281. For example, the first rotatable carrier 288 can be positioned adjacent the wheel assembly 120. The second rotatable carrier 286 can be coupled between the first rotatable carrier 288 and the central region 170. In some embodiments, the upper housing 146 of the second pedal housing 140 is coupled with the first and/or second rotatable carriers 288, 286 and fastened therewith, such as by using a suitable mechanical fastener.

In some embodiments, an outer end of the upper housing 146 is coupled (e.g., directly) with the frame 290, and the frame 290 is coupled with the second rotatable carrier 288, enabling the upper housing 146 to rotate with respect to the axle 281. The upper housing 146 can be fastened with the frame 290 with any suitable mechanical fastener, such as screws, bolts, rivets, or otherwise. In other embodiments, the upper and lower housings 146, 148 are coupled together around the frame 290. In certain implementations, the frame 290 provides support to the upper and lower housings 146, 148. The frame 290 can include one or more ribs 490, which can extend generally in an axial direction along the length of the frame 290. The ribs 490 can provide additional strength and/or rigidity to the frame 290. This can inhibit or prevent unwanted bending of the frame 290 during use of the electric balance vehicle 100.

During use of the electric balance vehicle 100, the feet of the user can rest on the platform 132 of the first pedal housing 130 and the platform 142 of the second pedal housing 140, respectively. The first pedal housing 130 can be rotatable with respect to the second pedal housing 140. A change in the feet position and/or the center of gravity of the user standing on the electric balance vehicle 100 can cause rotation of the second pedal housing 140. For example, the user can shift his or her center of gravity to rotate the second pedal housing 140, or the user can articulate his or her foot to rotate the second pedal housing 140. The second pedal housing 140 can rotate with respect to the axle 281. For example, the second pedal housing 140 can be rotated on the first and/or second rotatable carriers 288, 286 that can be rotatably coupled on the axle 281. In some embodiments, the frame 290 rotates with respect to the axle 281 along with the second pedal housing 140.

The inertial sensors corresponding to the second pedal housing 140 can transmit the data signal indicating the rotation of the second pedal housing 140 to the controller 274. This data signal can include, for example, data indicating the amount of rotation or angle of rotation of the second pedal housing 140 with respect to a horizontal reference point, a ground surface, the axle 281, the wheel assembly 120 and/or the first pedal housing 130. Based on the data signal from the inertial sensors, the controller 274 can provide a control signal including instructions and/or power to operate the wheel assembly 120. The control signal can operate the second wheel assembly 120 by delivering power from the battery 270 to accelerate rotation of the wheel 121 of the wheel assembly 120, decelerate rotation of the wheel 121 of the wheel assembly 120 and/or maintain the speed or position of the wheel assembly 120. The control signal can be, for example, in the form of pulse width modulation (PWM).

In some embodiments of the electric balance vehicle 100, when the inertial sensors detect that the second pedal housing 140 has been rotated in a forward direction, the inertial sensors can deliver the data signal to the controller 274 indicating the forward rotation and the controller 274 can send the control signal to the second wheel assembly 120 to accelerate the wheel 121 in a forward direction. In some embodiments of the electric balance vehicle 100, when the inertial sensors detect that the second pedal housing 140 has been rotated in a backward direction, the inertial sensors can deliver the data signal to the controller 274 indicating the backward rotation and the controller 274 can send the control signal to the second wheel assembly 120 to accelerate the wheel 121 in a backward direction. In some embodiments, the controller 274 can provide power to the second wheel assembly 120 to maintain an upright position or otherwise provide balance to the second pedal housing 140.

A change in the feet position and/or the center of gravity of the user standing on the electric balance vehicle 100 can cause rotation of the first pedal housing 130. For example, the user can shift his or her weight or center of gravity to cause rotation of the first pedal housing 130 or rotate his or her foot to rotate the first pedal housing 130. The first pedal housing 130 can be fixed with respect to the axle 281. For example, the first pedal housing 130 can be fixed with the axle 281 by the first and/or second fixed carriers 282, 284.

When rotated, the first pedal housing 130 and/or the axle 281 can rotate relative to the second pedal housing 140, the frame 290 and/or the first and second rotatable carriers 288, 286.

The inertial sensors corresponding to the first pedal housing 130 can transmit the data signal indicating the rotation of the first pedal housing 130 to the controller 272. This data signal can include, for example, data indicating the amount of rotation or angle of rotation of the first pedal housing 130 with respect to the horizontal reference point, the ground surface, the axle 281, the wheel assembly 120 and/or the second pedal housing 140. Based on the data signal from the inertial sensors, the controller 272 can provide a control signal including instructions and/or power to operate the first wheel assembly 110. The control signal can operate the first wheel assembly 110 by delivering power from the battery 270 to accelerate rotation of the wheel 111 of the wheel assembly 110, decelerate rotation of the wheel 111 and/or maintain the speed or position of the wheel 111. The control signal can be, for example, in PWM form.

In some embodiments of the electric balance vehicle 100, when the inertial sensors detect that the first pedal housing 130 has been rotated in a forward direction, the inertial sensors can deliver the data signal to the controller 272 and the controller 272 can send the control signal to accelerate the first wheel assembly 110 in a forward direction. In some embodiments, when the inertial sensors detect rotation of the first pedal housing 130 in a backward direction, the inertial sensors can deliver the data signal to the controller 272 and the controller 272 can send the control signal to accelerate the first wheel assembly 110 in a backward direction. In some embodiments, the controller 272 can provide power to the first wheel assembly 110 to maintain an upright position or otherwise provide balance to the first pedal housing 130.

Figure 5:
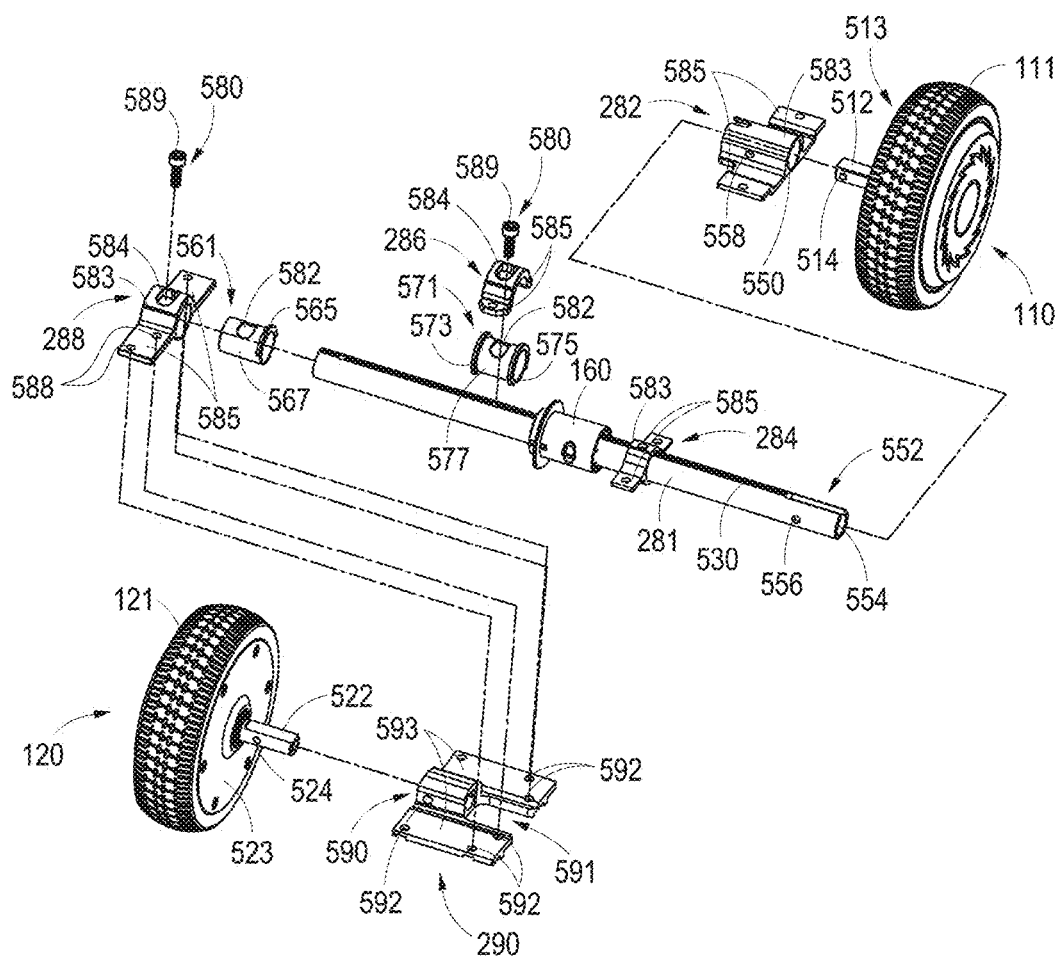
FIG. 5 is a partial exploded view of the axle assembly of FIG. 4.

As illustrated in FIG. 5, the first and second rotatable carriers 288, 286 and the fixed carriers 282, 284 can each comprise a sleeve 583 and one or more flanges 585 extending therefrom. The sleeve 583 can be positioned or sleeved on (e.g., fitted over and/or around) the axle 281. In some embodiments, the flanges 585 extend generally perpendicularly from the sleeve 583. Each of the flanges 585 can comprise one or more fastener holes 588 or other mechanical fasteners for coupling with any of the first and second pedal housings 130, 140 or the frame 290. In some embodiments, the holes 588 are spaced apart from each other along the axial direction of the lateral axle. This can provide an increased capability of resisting bending when bearing loads.

The first and second rotatable carriers 288, 286 can include bushings 561, 571, respectively, sleeved on the axle 281. The bushings 561, 571 can be made of steel, nylon, brass or any other suitable material. In some implementations, either of the bushings 561, 571 can be sleeve bushings (with or without lubrication) or include bearing (e.g., needle or ball bearings). The bushings 561, 571 can provide a smooth sliding surface on which the rotatable carriers 288, 286 can rotate with reduced friction. In some embodiments, the bushings 561, 571 can be fixed on the axle 281 such that they remain axially in substantially the same location along the axle 281 and/or are substantially rotationally fixed with the axle 281. For example, the bushings 561, 571 can be press-fitted or shrink-fitted with the axle 281. The bushing 561 can comprise a sleeve portion 567 and a lip portion 565 positioned on one side of the sleeve portion 567. The sleeve 583 of the rotatable coupling 288 can be slipped over the sleeve portion 567 of the bushing 561 on the side, opposite the lip portion 565 during assembly of the axle assembly 290. The bushing 571 can comprise a sleeve portion 577 and first and second lip portions 575, 573 positioned on opposite sides of the sleeve portion 577. The sleeve 583 can be open on one side such that the rotatable coupling 286 can be slipped over the bushing 571. For example, the coupling 286 can be generally "C" shaped (e.g., a cross section of the coupling 286). The rotatable coupling 286 can be maintained in place on the bushing 571 by the flanges 585 of the rotatable coupling 286, the flanges 585 being coupled with either of the upper or lower housings 146, 148, such as using mechanical fasteners.

In some embodiments, the axle 281 can include a generally planar portion 530. In such embodiments, the axle 281 is not perfectly cylindrical. In some embodiments, the fixed carriers 282, 284 can be shaped to match the profile of the axle 281 including the planar portion 530. This can inhibit or prevent rotation of the fixed carriers 282, 284 relative to the axle 281. As noted above, the fixed carriers 282, 284 can include flanges 585 for supporting the first pedal housing 130. In some embodiments, the flanges 585 can be assembled with the upper housing 136 and/or lower housing 138 using any suitable mechanical fasteners.

In some embodiments, the frame 290 can comprise one or more flanges 593. The flanges 593 of the frame 290 can include a plurality of fastener holes 592. Some of the fastener holes 592 can correspond to fastening locations on the upper housing 146 and/or the lower housing 148 of the second pedal housing 140, which can allow the housings 146, 148 to be coupled with the frame 290. Some of the fastener holes 592 can correspond to the holes 588 of the flanges 585 of the second rotatable carrier 288, which allows the second rotatable carrier 288 to be coupled with the frame 290. Some of the fastener holes 592 can correspond to fasteners on the second controller 274 or the controller housing 372, which can allow the second controller 274 to be coupled with the frame 290.

The frame 290 can include a generally U-shaped slot 591 (e.g., when viewed from above). The second end of the axle 281 can extend into this U-shaped slot 591. In some embodiments, the U-shaped slot 591 enables the rotatable carrier 288 and/or the second end of the axle 281 to be spaced adjacent to the frame 290 and/or partially located within the U-shaped slot 591. This configuration can reduce the overall length of the axle assembly 280 and/or reduce stress on the components of the axle assembly 280. In some embodiments, the rotational axis of the frame 290 is generally aligned (e.g., collinear) with the rotational axis of the rotatable carrier 288. In some implementations, the frame 290 can include a semi-circular groove (like the rotatable carrier 286) at least partially within the U-shaped slot 591 to provide further support to the connection with the axle 281.

In various embodiments, the flanges 585 of the rotatable carrier 288 are mechanically connected with the flanges 593 of the frame 290 (e.g., pin, screw, weld, clip, and/or bolt). This can provide a secure connection between the axle 281/rotatable carrier 288 and the frame 290. For example, a planar portion of the flanges 593 can be placed over or under a corresponding planar portion of the flanges 585, or vice versa. The fastener holes 592 on the flanges 593 can be aligned with the fastener holes 588 of the flanges 585 of the second rotatable carrier 288, such that a suitable mechanical fastener (e.g., pin, screw, and/or bolt) can extend through both flanges 585, 593 and thereby the second rotatable carrier 288 can be coupled with the frame 290. As another example, an extension (not shown) on the flanges 593 can be received within a receiving space (not shown) on the flanges 585, or vice versa. The extension can be held in place using a suitable mechanical fastener (e.g., pin, screw and/or bolt). As another example, the flanges 585 and flanges 593 can be abutted together end-to-end and mechanically fastened together (e.g., welded). In another example, the rotatable carrier 288 is integrally formed with the frame 290 and the frame 290 can be rotatably coupled with the second end of the axle 281 without a separate second rotatable carrier.

A wheel axle 512 of the first wheel assembly 110 can extend from the wheel 111. The wheel axle 512 can correspond to a rotatable shaft of the drive motor of the first wheel assembly 110. The rotatable shaft can be positioned within a stator (not shown) of the drive motor within the rim of the wheel 111. The wheel 111 can include a plate 513 coupled with the rim of the wheel 111, the wheel axle 512 can extend from the wheel 111 through the plate 513. In certain embodiments, the rotating shaft of the drive motors is mounted inside the wheel 111 and the stator is provided within the corresponding pedal housing or otherwise outside of the wheel 111 and the rotatable shaft coupled with the wheel 111.

The wheel axle 512 can be assembled on (e.g., received in) the first end of the axle 281. The first end of the axle 281 can extend to an outer end of the first pedal housing 130 through the inner cavity 137. The outer end of the first pedal housing 130 can be adjacent to the first wheel assembly 110. In some embodiments, the wheel axle 512 is coupled directly with the axle 281. For example, the wheel axle 512 of the first wheel assembly 110 can be inserted within a receiving cavity 554 of the axle 281 and coupled in place using a suitable mechanical fastener, such as a pin extending through a pin hole 556 on a side of the axle 281 and extending through a corresponding pin hole 514 on the wheel axle 512. In another example, the wheel axle 512 is inserted within a receiving cavity 550 of the fixed carrier 282 and coupled in place therewith using a suitable mechanical fastener, such as a pin extending through a pin hole 558 on a side of the fixed carrier 282 and extending through the corresponding pin hole 514 on the wheel axle 512. Some embodiments have multiple pin locations and corresponding pin holes, which can facilitate a reliable connection between the wheel axle 512 and the axle 281 or fixed carrier 282.

A wheel axle 522 of the second wheel assembly 120 can extend from the wheel 121. The wheel axle 522 can correspond to a rotation shaft of the drive motor of the second wheel assembly 120. The wheel axle 522 can extend from a stator (not shown) of the drive motor within the rim of the wheel 121. The wheel 121 can include a plate 523 coupled with the rim of the wheel 121, the wheel axle 522 extending therethrough. The wheel axle 522 can be assembled on (e.g., received in) the frame 290. For example, the wheel axle 512 can be inserted within a receiving cavity 590 of the frame 290 and coupled in place therewith using a suitable mechanical fastener, such as a pin extending through a pin hole 592 on a side of the frame 290 and extending through the corresponding pin hole 524 on the wheel axle 522. Some embodiments have multiple pin locations and corresponding pin holes, which can facilitate a reliable connection between the wheel axle 522 and the frame 290.

The first end of the axle 281 can include a slit 552. The slit 552 can provide an opening for routing a cable into the drive motor of the first wheel assembly 110. The cable can extend through the slit 552 and a hollow space within the wheel axle 512 and leading to the stator of the first wheel assembly 110. Similarly, in some embodiments, a cable can extend through a hollow space within the wheel axle 522 leading to the stator of the second wheel assembly 120. In some implementations, the cable is routed through the axle 281, such as through an inner passage between the first and second ends of the axle 281. In some variants, the second end of the axle 281 has a slit 552 for receiving a cable.

Some embodiments are configured to limit a rotation angle of the second pedal housing 140 relative to the axle 281 and/or the first pedal housing 130. For example, rotation of the second pedal housing 140 can be limited to protect cables connecting the battery 270 with the second wheel assembly 120. Certain embodiments have a limit structure 580 to limit the relative rotation angle of the second pedal housing 140. In some embodiments, the limit structure 580 can include the second rotatable carrier 286, a limit slot 582 extending through the sleeve 571, a limit slot 584 (or other cutout of the sleeve 571) extending through the rotatable carrier 286 and/or a limit pin 589. In various embodiments, the limit pin 589 is fixed relative to the axle 281. When assembled, the limit pin 589 can extend through the corresponding limits slot 582, 584 and be coupled with the axle 281. The limit pin 589 can be in the form of a bolt, pin, or screw, or otherwise. The limit pin 589 can be removably coupled within a receiving hole on the axle 281. The corresponding limit slots 582, 584 allow for some rotation of the rotatable carrier 286 with respect to the axle 281, depending on the length of the limit slots 582, 584. The limit pin 589 can inhibit or stop rotation of the rotatable carrier 286 in response to the second pedal housing 140 being rotated such that an end of one of the limit slots 582, 584 contacts the fixed limit pin 589. In some embodiments, either or both of the first and second rotatable carriers 288, 286 include limit structures 580.

The axle 281 can provide support for the first and second pedal housings 130, 140. In some implementations, the axle 281 can have a small diameter, be lightweight and/or be easy to manufacture. This can be beneficial over certain other designs that have an "inner cover," which can take up a large volume within the structure of the electric balance vehicle 100 and add significantly to the bulk and weight of the electric balance vehicle 100. Moreover, the "inner cover" is generally complicated in structure and manufactured of a material that is fragile under stress, prone to fatigue failure, overly heavy and/or is expensive to manufacture. The central region 170 of the vehicle 100, with its axle 281 can have a small cross-sectional diameter in comparison to certain designs with an inner cover. This can facilitate easy grasping by a user's hand. In some embodiments, the diameter of the central region 170 is approximately twice a diameter (or the largest cross-sectional dimension) of the axle 281. In some embodiments, the diameter of the central region 170 is less than the largest dimension of the first or second fixed carriers 282, 284 (including the flanges 585).

In various embodiments, the tapered regions 131, 141 taper down to a neck with a minimum diameter at the central region 170. The minimum diameter can be substantially less than the front to rear width of the outside of the platforms 132, 142, such as at the intersection with the fender portions 134, 144. For example, ratio of the minimum diameter of the neck to the width of the outside of the platforms 132, 142 can be at less than or equal to about: 0.33, 0.25, 0.20, ratios between the aforementioned ratios, or other ratios. Having a neck with a small diameter can be advantageous over certain other design with an "inner cover," which can have a large central rotating mechanism that is bulky and inconvenient to grasp.

In some implementations, the axle assembly 280 can extend through both the first and second pedal housings 130, 140 and the central region 170 at the tapered regions 131, 141. The weight of the user on the platforms 132, 142 can be distributed across substantially the entire length of the axle assembly 280 as it extends between outer ends of the first and second pedal housings 130, 140. Another advantage of a small diameter/volume of the axle 281 is that it can take up only a small amount of space within the inner cavities 137, 147 of the first and second pedal housings 130, 140. This can enable additional components, such as a battery with a larger capacity, to be positioned within either or both of the inner cavities 137, 147.

Figure 6:
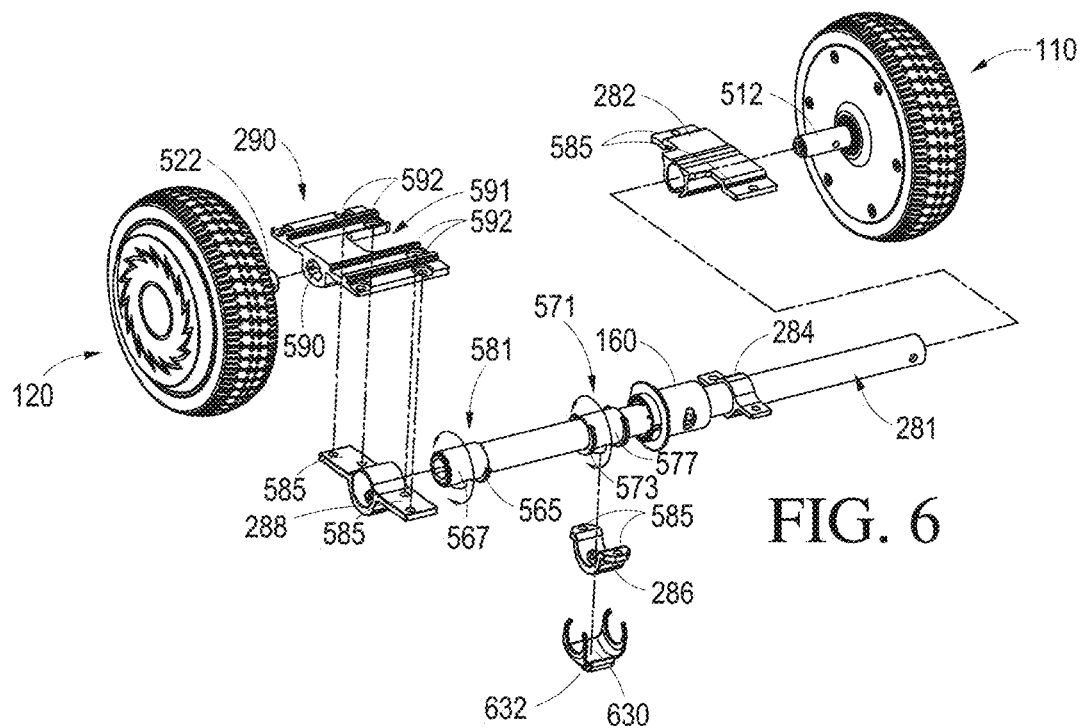
FIG. 6 is another partial exploded assembly view of the axle assembly of FIG. 4.
Figure 7:
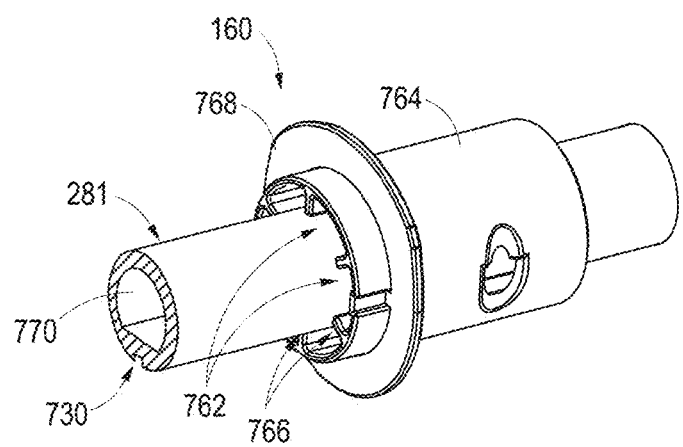
FIG. 7 is a perspective view of a bushing of the axle assembly of FIG. 6.
Figure 8:
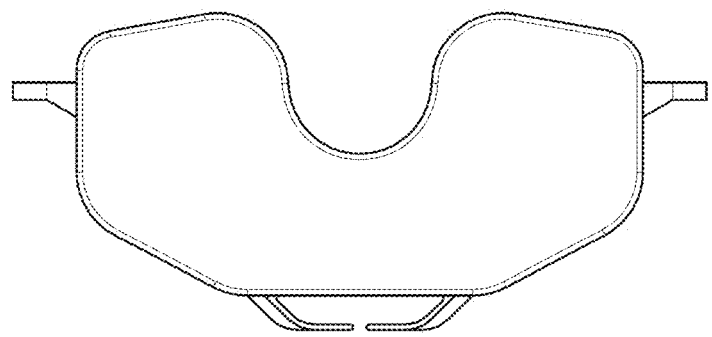
FIG. 8 is a front view of an embodiment of a battery that can be used in the electric balance vehicle of FIG. 1.
Figure 9:
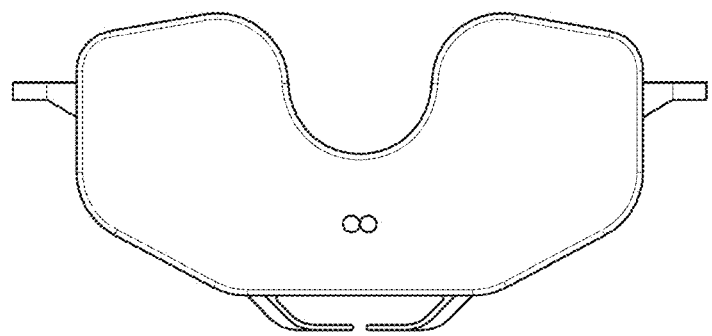
FIG. 9 is a rear view of the battery of FIG. 8.
Figure 10:
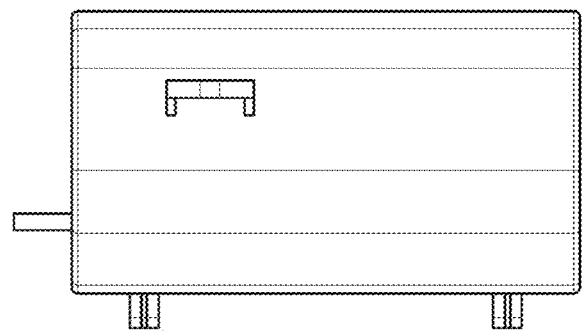
FIGS. 10 and 11 are right and left side views of the battery of FIG. 8.
Figure 11:
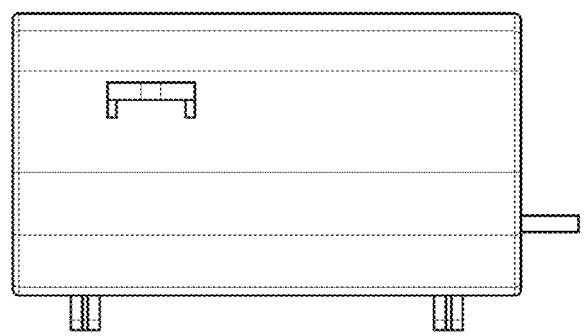
Figure 12:
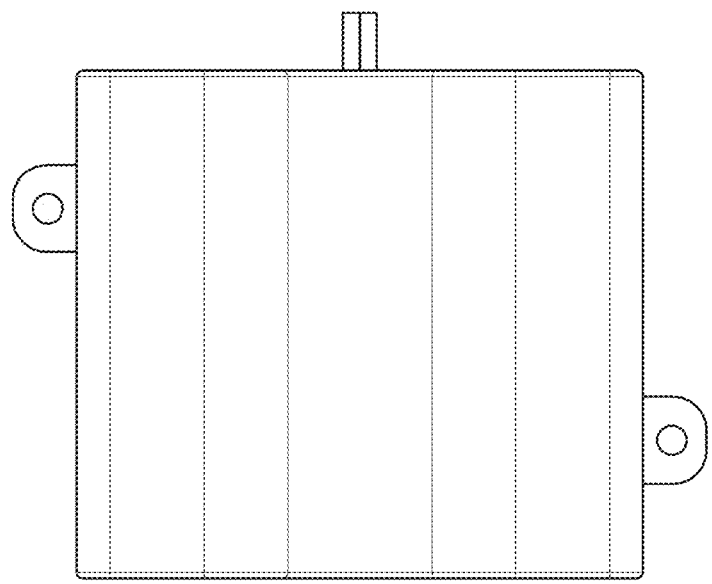
FIGS. 12 and 13 are bottom and top views of the battery of FIG. 8.
Figure 13:
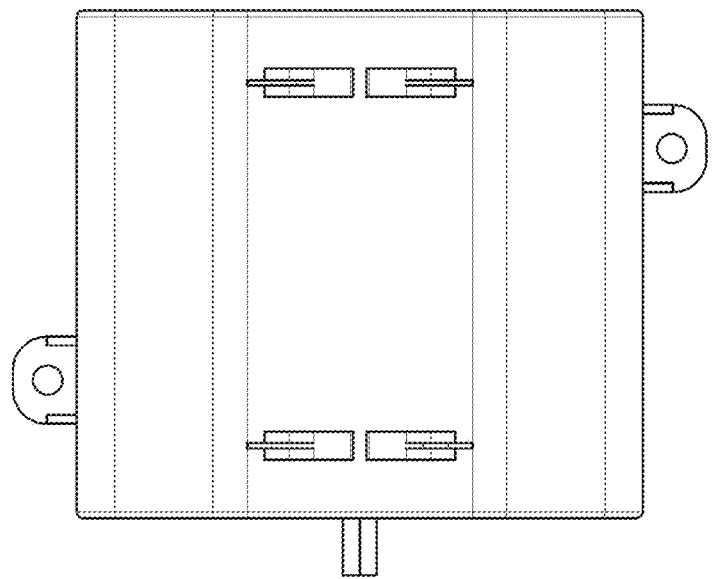
Figure 14:
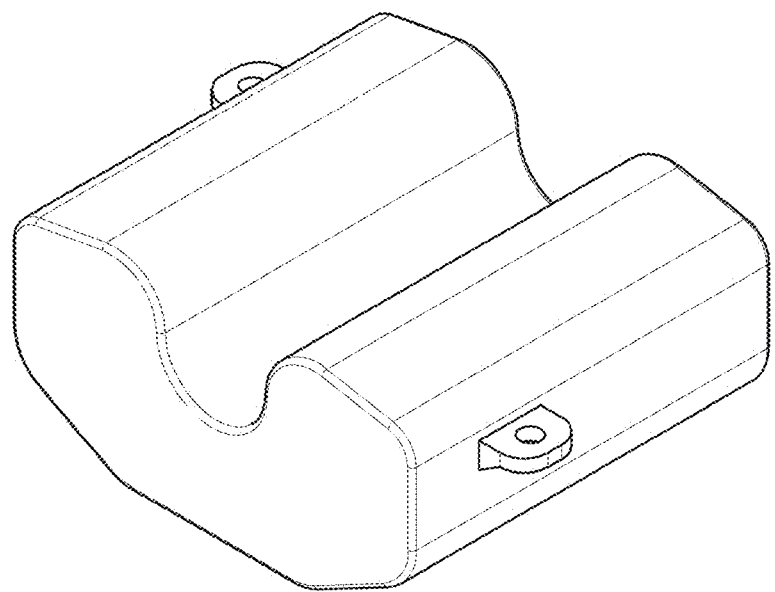
FIGS. 14 and 15 are top perspective and bottom perspective views of the battery of FIG. 8.
Figure 15:
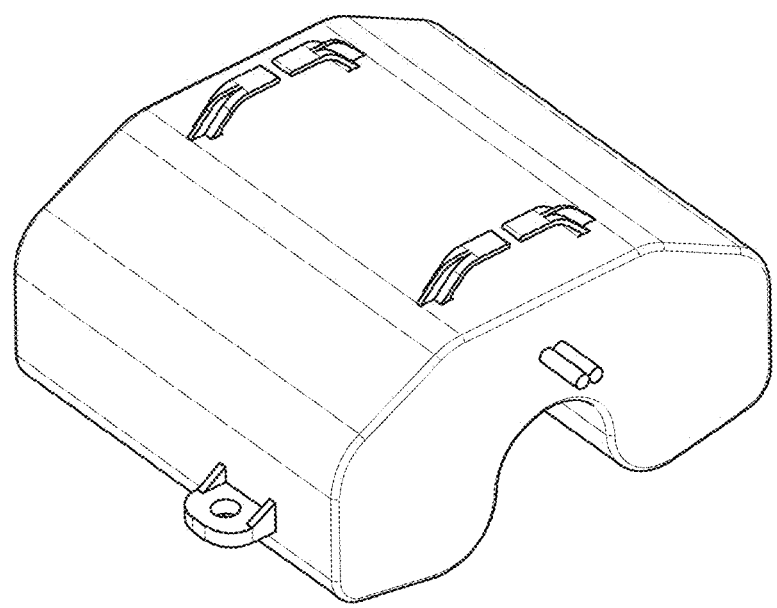

In FIGS. 6 and 7, the axle 281 is mated with (e.g., sleeved) a bushing 160. The bushing 160 can include a bushing ring 768, which can extend generally radially outward from a sleeve 764. The bushing 160 can provide support for rotation of the second pedal housing 140 about the axle 281. The bushing 160 can be made of any material that can slidingly engage with either of the axle 281 or the second pedal housing 140, such as nylon or other plastics. In some embodiments, one end of the sleeve 764 of the bushing 160 can extend into the first pedal housing 130 and the other end of the sleeve 764 can extend into the second pedal housing 140. As illustrated, the bushing 160 can be axially positioned between the second fixed carrier 284 and the second rotatable carrier 286. In some variants, the bushing 160 is at or near the axial midpoint of the axle 281.

The bushing ring 768 can extend between the first and second pedal housings 130, 140. In some embodiments, the ring 768 can provide a reduced-friction sliding surface for the relative rotation of the first and second pedal housings 130, 140. The bushing ring 768 can be configured to substantially isolate the first pedal housing 130 and the second pedal housing 140. For example, movement and/or vibration of one housing can be inhibited or prevented from being transferred to the other housing. The bushing ring 768 can be assembled on the bushing 160 by sliding it axially onto the bushing sleeve 764. In some implementations, adjustments to the axial position of the bushing ring 768 with respect to the axle 281 can be made as necessary during assembly of the electric balance vehicle 100. In some embodiments, the bushing ring 768 and the bushing sleeve 764 are integrally formed. In some embodiments, the bushing ring 768 can be made from a material different from that of the bushing 160 and/or the material of the bushing ring 768 and can be coordinated with the color design of the electric balance vehicle 100.

The bushing 160 can include a channel 762. The channel 762 can be separated by inwardly extending ribs 766. The channel 762 can connect the inner cavities 137, 147 of the first and second pedal housings 130, 140. In some embodiments, a cable can be passed between the first and second pedal housings 130, 140 through a hollow space 770 within the axle 281. This can enable a cable to extend from the inner cavity of one pedal housing to the inner cavity of the other pedal housing without being squeezed and damaged by the rotating elements of the electric balance vehicle 100.

In some embodiments, any of the fixed or rotatable carriers 282-288 can include a wire rack 630. The wire rack 630 can include one or more securing features such as first and second clips, for attaching to the axle 281 and/or the fixed or rotatable carriers 282-288. The wire rack 630 can include a cable clip 632 configured to receive a cable and to position the cable in a desired location, such as adjacent to the axle 281.

In some embodiments, an axial groove 730 is provided on an outer surface of the axle 281. For example, the groove 730 can be on the planar portion 530. The groove 730 can extend generally parallel to the axial axis of the axle 281 for any length along the axle 281. A rib or key (not shown) can be positioned in the groove 730 and within corresponding grooves on the bushings 561, 571. The keyed connection can inhibit or prevent the bushings 561, 571 from rotating with respect to the axle 281. Similarly, the rib or key (or a different rib or key) can be inserted within the groove 730 and within corresponding grooves on either of the fixed carriers 282, 284 sleeved on the axle 281. This can inhibit or prevent the fixed carriers 282, 284 from rotating with respect to the axle 281. In some embodiments, one of the inwardly extending ribs 766 of the bushing 160 is positioned within the axial groove 730 for inhibiting or preventing the rotation of the bushing 160 about the axle 281.

As previously mentioned, the electric balance vehicle 100 can include a power source, such as a battery 270. FIGS. 8-15 illustrate an example of such a battery. The ornamental design of the battery, or portions thereof, is within the scope of this disclosure.

The terms "first" and "second" are merely numbered for describing corresponding technical features clearly and do not represent the actual order. During particular implementations, the locations of the technical features defined by the terms "first" and "second" are interchangeable.

Terms of orientation used herein, such as "top," "bottom," "horizontal," "vertical," "longitudinal," "lateral," "outer," "inner," and "end" are used in the context of the illustrated embodiment. However, the present disclosure should not be limited to the illustrated orientation. Indeed, other orientations are possible and are within the scope of this disclosure. Terms relating to circular shapes as used herein, such as "diameter" or "radius," should be understood not to require perfect circular structures, but rather should be applied to any suitable structure with a cross-sectional region that can be measured from side-to-side. Terms relating to shapes generally, such as "circular" or "cylindrical" or "semi-circular" or "semi cylindrical" or any related or similar terms, are not required to conform strictly to the mathematical definitions of circles or cylinders or other structures, but can encompass structures that are reasonably close approximations.

The terms "approximately," "about" and "substantially" as used herein represent an amount close to the stated amount that still performs a desired function or achieves a desired result. For example, in some embodiments, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Conditional language, such as "can," "could," "might," or "may," unless specifically stated otherwise or otherwise understood within the context as used, is generally intended to convey that certain embodiments include or do not include, certain features, elements and/or steps. Thus, such conditional language is not generally intended to imply that features, elements and/or steps are in any way required for one or more embodiments.

Conjunctive language, such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require the presence of at least one of X, at least one of Y and at least one of Z.

Some embodiments have been described in connection with the accompanying drawings. The figures are drawn to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed and/or rearranged. Further, the disclosure herein of any particular feature, aspect, method, property, characteristic, quality, attribute, element or the like in connection with various embodiments can be used in all other embodiments set forth herein. Additionally, any methods described herein may be practiced using any device suitable for performing the recited steps.

Although this invention has been disclosed in the context of certain embodiments and examples, the scope of this disclosure extends beyond the specifically disclosed embodiments to other alternative embodiments and/or uses of the invention and obvious modifications and equivalents thereof. Any system, method, and device described in this application can include any combination of the preceding features described in this and other paragraphs, among other features and combinations described herein, including features and combinations described in subsequent paragraphs. While several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Various features and aspects of the disclosed embodiments can be combined with or substituted for, one another in order to form varying modes of the disclosed invention. Thus, it is intended that the scope of the present invention herein disclosed should not be limited by the particular disclosed embodiments described above, but should be determined only by a fair reading of the claims that follow.

The invention claimed is:

1. A two-wheeled electric balance vehicle comprising:
a first pedal housing;
a first wheel assembly associated with the first pedal housing, the first wheel assembly comprising a first wheel, a first motor, and a first axis of rotation;
a second pedal housing;
a second wheel assembly associated with the second pedal housing, the second wheel assembly comprising a second wheel, a second motor, and a second axis of rotation, the second wheel being substantially parallel to the first wheel, the second axis of rotation being substantially colinear with the first axis of rotation;
a support axle comprising a first end in the first pedal housing and a second end in the second pedal housing;
a battery electrically coupled with the first and second motors, the battery nested with the support axle;
a first sensor in the first pedal housing and a second sensor in the second pedal housing, the first and second sensors configured to sense rotation of the first pedal housing and the second pedal housing, respectively; and
electronic control circuitry configured to control the first motor using a signal from the first sensor and to control the second motor using a signal from the second sensor.

2. The two-wheeled electric balance vehicle of claim 1, wherein the electronic control circuitry comprises a first controller in the first pedal housing and a second controller in the second pedal housing.

3. The two-wheeled electric balance vehicle of claim 2, wherein the first controller is positioned between the battery and the first motor and the second controller is positioned between the second end of the support axle and the second motor.

4. The two-wheeled electric balance vehicle of claim 1, wherein the first end of the support axle is closer to the first motor than the second end of the support axle is to the second motor.

5. The two-wheeled electric balance vehicle of claim 1, wherein the battery comprises a base, a first upper extension extending from the base, a second upper extension extending from the base, and a lateral groove located between the first upper extension and the second upper extension.

6. The two-wheeled electric balance vehicle of claim 1, wherein the battery has a U-shaped cross-section.

7. The two-wheeled electric balance vehicle of claim 1, wherein the first pedal housing and the second pedal housing each comprise a front surface with a light powered by the battery.

8. The two-wheeled electric balance vehicle of claim 1, wherein a bottom of the battery is positioned under the axle and a top of the battery is approximately level with a top of the axle.

9. The two-wheeled electric balance vehicle of claim 1, wherein the electronic control circuitry comprises a controller, the controller positioned between the battery and the first wheel.

10. The two-wheeled electric balance vehicle of claim 1, wherein the first and second sensors each comprise a gyroscope or accelerometer.

11. A two-wheeled electric balance vehicle comprising:
a first pedal housing;
a first wheel assembly associated with the first pedal housing, the first wheel assembly comprising a first wheel, a first motor, and a first axis of rotation;
a second pedal housing;
a second wheel assembly associated with the second pedal housing, the second wheel assembly comprising a second wheel, a second motor, and a second axis of rotation, the second wheel being substantially parallel to the first wheel, the second axis of rotation being substantially colinear with the first axis of rotation;
a support axle comprising a first end in the first pedal housing and a second end in the second pedal housing;
a battery electrically coupled with the first and second motors, the battery located in one of the first and second pedal housings, the battery comprising a lateral groove and the support axle positioned within the lateral groove;
a first sensor in the first pedal housing and a second sensor in the second pedal housing, the first and second sensors configured to sense rotation of the first pedal housing and the second pedal housing, respectively; and
electronic control circuitry configured to control the first motor using a signal from the first sensor and to control the second motor using a signal from the second sensor.

12. The two-wheeled electric balance vehicle of claim 11, wherein the first end of the support axle is fixedly coupled to an axle of the first motor.

13. The two-wheeled electric balance vehicle of claim 11, wherein the first end of the support axle is closer to the first motor than the second end of the support axle is to the second motor.

14. The two-wheeled electric balance vehicle of claim 11, wherein the two-wheeled electric balance vehicle is configured such that the first pedal housing and the support axle rotate as a unit and the second pedal housing and the support axle rotate relative to each other.

15. The two-wheeled electric balance vehicle of claim 11, wherein the electronic control circuitry comprises a first electronic controller in the first pedal housing and a second electronic controller in the second pedal housing.

16. The two-wheeled electric balance vehicle of claim 11, wherein the battery further comprises a base, a first upper extension extending from the base, and a second upper extension extending from the base.

17. The two-wheeled electric balance vehicle of claim 11, wherein the battery comprises a bottom, a first upper extension on a first lateral side of the bottom, and a second upper extension on a second lateral side of the bottom, the bottom positioned underneath the axle, the first upper extension positioned on a first side of the axle, the second upper extension positioned on a radially opposing second side of the axle, the first upper extension and the second upper extension each having a respective top positioned at an elevation approximately equal with a top of the axle.

18. The two-wheeled electric balance vehicle of claim 11, wherein the first pedal housing comprises a platform configured receive a user's foot, and wherein the battery at least partly supports the platform.

19. The two-wheeled electric balance vehicle of claim 11, wherein the first and second sensors each comprise a gyroscope or accelerometer.

20. A two-wheeled electric balance vehicle comprising:
a first pedal housing;
a first wheel assembly associated with the first pedal housing, the first wheel assembly comprising a first wheel, a first motor, and a first axis of rotation;
a second pedal housing;
a second wheel assembly associated with the second pedal housing, the second wheel assembly comprising a second wheel, a second motor, and a second axis of rotation, the second wheel being substantially parallel to the first wheel, the second axis of rotation being substantially colinear with the first axis of rotation;
a support axle comprising a first portion and a second portion, the first portion in the first pedal housing, the first portion comprising a first carrier and a second carrier; and
a battery electrically coupled with the first and second motors, the battery nested with the support axle and positioned between the first and second carriers.

21. The two-wheeled electric balance vehicle of claim 20, wherein the first and second carriers are fastened to the first pedal housing.

22. The two-wheeled electric balance vehicle of claim 20, wherein the battery comprises two upper extensions spaced apart by a lateral groove, the lateral groove receiving the support axle.

23. The two-wheeled electric balance vehicle of claim 20, further comprising a rotation limiter that includes a limit slot and a limit pin, the limit pin fixed to the support axle and having an end positioned in the limit slot.

* * * * *